United States Patent
Cobb et al.

(10) Patent No.: US 9,183,576 B2
(45) Date of Patent: *Nov. 10, 2015

(54) METHODS AND SYSTEMS FOR INSERTING MEDIA CONTENT

(71) Applicant: Limelight Networks, Inc., Tempe, AZ (US)

(72) Inventors: Jonathan W. Cobb, Piedmont, CA (US); Ryan B. Bloom, Raleigh, NC (US); David Rowley, Benicia, CA (US); Scott Anderson, San Francisco, CA (US); Abbas Mahyari, Newark, CA (US)

(73) Assignee: Limelight Networks, Inc., Tempe, AZ (US)

( * ) Notice: Subject to any disclaimer, the term of this patent is extended or adjusted under 35 U.S.C. 154(b) by 448 days.

This patent is subject to a terminal disclaimer.

(21) Appl. No.: 13/759,886

(22) Filed: Feb. 5, 2013

(65) Prior Publication Data

US 2013/0151353 A1   Jun. 13, 2013

Related U.S. Application Data

(63) Continuation of application No. 13/245,786, filed on Sep. 26, 2011, now Pat. No. 8,738,734, which is a continuation of application No. 12/770,600, filed on Apr. 29, 2010, now Pat. No. 8,738,787, and (Continued)

(51) Int. Cl.
*G06Q 30/02* (2012.01)
*H04N 21/234* (2011.01)
*H04N 21/2368* (2011.01)

(52) U.S. Cl.
CPC ............ *G06Q 30/0277* (2013.01); *G06Q 30/02* (2013.01); *H04N 21/2368* (2013.01); *H04N 21/23424* (2013.01)

(58) Field of Classification Search
CPC .............. G06Q 30/0277; G06Q 30/02; H04N 21/23424; H04N 21/2368
USPC .................... 709/227, 229; 705/14.49, 14.58; 725/32, 36

See application file for complete search history.

(56) References Cited

U.S. PATENT DOCUMENTS 5,768,680 A   6/1998  Thomas
5,802,599 A   9/1998  Cabrera et al.

(Continued)

OTHER PUBLICATIONS

Govoni, "Dictionary of marketing communications", 2004, Sage Publications.

(Continued)

*Primary Examiner* — Joe Chacko
(74) *Attorney, Agent, or Firm* — Kilpatrick Townsend & Stockton, LLP

(57) ABSTRACT

A method and system for providing a content object is disclosed with an in-stream ad unit inserted into the content object for a content object player. The content object is audio and/or video. The processed content object is downloaded or streamed to the content object player. A method for content insertion is provided. In this method, a first media data is received from a server and a placement request is transmitted to a content provider service. As a result, a placement response is received from the content provider service. The placement response includes data identifying a second media data associated with the first media data. The second media data is retrieved and merged with the first media data. After the merge, the first and second media data are transmitted to the server.

20 Claims, 15 Drawing Sheets

Related U.S. Application Data application No. 13/245,786, which is a continuation-in-part of application No. 11/406,675, filed on Apr. 18, 2006, now Pat. No. 8,291,095.

(60) Provisional application No. 61/238,100, filed on Aug. 28, 2009, provisional application No. 60/673,128, filed on Apr. 20, 2005.

(56) References Cited

U.S. PATENT DOCUMENTS

| | | |
|---|---|---|
| 5,815,689 A | 9/1998 | Shaw et al. |
| 6,115,035 A | 9/2000 | Compton et al. |
| 6,216,152 B1 | 4/2001 | Wong et al. |
| 6,236,009 B1 | 5/2001 | Emigh et al. |
| 6,654,814 B1 | 11/2003 | Britton et al. |
| 6,704,930 B1 | 3/2004 | Eldering et al. |
| 7,107,582 B2 | 9/2006 | Clarke et al. |
| 7,165,036 B2 | 1/2007 | Kruk et al. |
| 7,165,218 B1 | 1/2007 | Hancock |
| 7,281,008 B1 | 10/2007 | Lawrence et al. |
| 7,373,599 B2 | 5/2008 | McElfresh et al. |
| 7,571,183 B2 | 8/2009 | Renshaw et al. |
| 7,574,499 B1 | 8/2009 | Swildens et al. |
| 7,640,296 B2 | 12/2009 | Fuchs et al. |
| 7,747,465 B2 | 6/2010 | Srinivasan et al. |
| 7,761,554 B1 | 7/2010 | Hild et al. |
| 2001/0037314 A1 | 11/2001 | Ishikawa |
| 2002/0010798 A1 | 1/2002 | Ben-Shaul et al. |
| 2002/0042738 A1 | 4/2002 | Srinivasan et al. |
| 2002/0065912 A1 | 5/2002 | Catchpole et al. |
| 2003/0001846 A1 | 1/2003 | Davis et al. |
| 2003/0012409 A1 | 1/2003 | Overton et al. |
| 2003/0097443 A1 | 5/2003 | Gillett et al. |
| 2003/0101412 A1 | 5/2003 | Eid |
| 2003/0129956 A1 | 7/2003 | Virolainen |
| 2003/0149937 A1 | 8/2003 | McElfresh et al. |
| 2003/0149938 A1 | 8/2003 | McElfresh et al. |
| 2003/0191816 A1 | 10/2003 | Landress et al. |
| 2004/0003398 A1 | 1/2004 | Donian et al. |
| 2004/0019675 A1 | 1/2004 | Hebeler et al. |
| 2004/0103024 A1 | 5/2004 | Patel et al. |
| 2004/0107169 A1 | 6/2004 | Lowe |
| 2004/0117427 A1 | 6/2004 | Allen et al. |
| 2004/0125140 A1 | 7/2004 | Bell et al. |
| 2004/0186894 A1 | 9/2004 | Jhingan et al. |
| 2004/0200337 A1 | 10/2004 | Abe et al. |
| 2004/0210948 A1 | 10/2004 | Jin et al. |
| 2004/0225562 A1 | 11/2004 | Turner |
| 2005/0091111 A1 | 4/2005 | Green et al. |
| 2005/0137958 A1 | 6/2005 | Huber et al. |
| 2005/0149880 A1 | 7/2005 | Postrel |
| 2005/0188403 A1 | 8/2005 | Kotzin |
| 2005/0273388 A1 | 12/2005 | Roetter |
| 2006/0010390 A1 | 1/2006 | Guido et al. |
| 2006/0021057 A1 | 1/2006 | Risan et al. |
| 2006/0149624 A1 | 7/2006 | Baluja et al. |
| 2006/0195859 A1 | 8/2006 | Konig et al. |
| 2007/0180066 A1 | 8/2007 | Sherwood et al. |
| 2008/0102947 A1 | 5/2008 | Hays et al. |
| 2009/0030802 A1 | 1/2009 | Plotnick et al. |
| 2010/0082439 A9 | 4/2010 | Patel et al. |

OTHER PUBLICATIONS

Green, "Adding Streaming Media to Your Web Site with Windows Media Technologies", 1999, Microsoft Corporation.
U.S. Appl. No. 11/406,675. filed Apr. 18, 2006, Non-Final Rejection mailed Nov. 28, 2008, 160 pages.
U.S. Appl. No. 11/406,675, filed Apr. 18, 2006, Final Rejection mailed Apr. 27, 2009, 53 pages.
U.S. Appl. No. 11/406,675, filed Apr. 18, 2006, Non-Final Rejection mailed Sep. 15, 2009, 63 pages.
U.S. Appl. No. 11/406,675, filed Apr. 18, 2006, Non-Final Rejection mailed May 25, 2010, 179 pages.
U.S. Appl. No. 11/406,675, filed Apr. 18, 2006, Final Rejection mailed Dec. 21, 2010, 202 pages.
U.S. Appl. No. 11/406,675, filed Apr. 18, 2006, Non-Final Rejection mailed Jul. 20, 2011, 261 pages.
U.S. Appl. No. 11/406,675, filed Apr. 18, 2006, Final Rejection mailed Mar. 16, 2012, 113 pages.
U.S. Appl. No. 11/406,675, filed Apr. 18, 2006, Notice of Allowance mailed Aug. 17, 2012, 64 pages.

METHODS AND SYSTEMS FOR INSERTING MEDIA CONTENT

CROSS-REFERENCES TO RELATED APPLICATIONS

This is a continuation patent application of U.S. application Ser. No. 13/245,786, filed on Sep. 26, 2011, which is a continuation of U.S. application Ser. No. 12/770,600, filed on Apr. 29, 2010, which is a non-provisional application of U.S. Application No. 61/238,100, filed Aug. 28, 2009. application Ser. No. 13/245,786 is also a continuation-in-part of application Ser. No. 11/406,675, filed on Apr. 18, 2006, which is a non-provisional application of U.S. Provisional Application No. 60/673,128, filed on Apr. 20, 2005. The entire disclosures of all these applications are incorporated by reference in their entirety for all purposes.

BACKGROUND

The present invention relates generally to software and, more particularly, to methods and systems for content insertion.

Display ad servers (DAS) provide a service that allows placement of display ads in a wide range of web sites. A display ad unit is defined herein to be an ad that is placed in a web page (banner ads, text ads, etc) and may include static (e.g., text, graphics and/or pictures) or dynamic content (e.g., audio, video, animation, and/or slideshow content). A web page may contain one or more tags that link to the DAS such that the DAS can supply a variable display ad when the web page is rendered. For example, banner slots have links associated with them that query the DAS for display ad units for embedding in the rendered web page. A display ad campaign is defined that will place a certain number of impressions of various display ad units at specified web sites or categories of web sites. The DAS tracks the number of impressions by receiving requests for display ad units and returning the display ad unit directly or indirectly through another server.

A DAS is not used for placement of dynamic content ads in audio or video ("AV") content objects (hereinafter an "in-stream ad unit"). A content object is a media file that is continuously streamed or downloaded and includes in-stream ad units contiguously placed into slots defined in the content object. The content object is played by a media player, set top box, IP TV, a browser, an applet within a browser, etc.

Ad campaigns for conventional display ad units are trafficked by advertizing operations teams. The display ad units are uploaded to or referenced by the DAS, and web sites or groups of sites are targeted by the ad campaign. For example, a banner ad for a dog food product could be sent to or referenced by the DAS, and four pet-specific web sites could be targeted by this ad campaign such that 100,000 impressions of that display ad unit would be delivered to those targeted web sites. A display ad unit may include static ads, animated ads, flash ads, and video and/or audio ads for insertion into predefined banner ad locations of a web page. Advertizing operations teams are familiar with using a DAS to deliver display ads units as part of an ad campaign.

A DAS can specify display ad units that are rendered in a web site by the browser after the browser requests a link to the DAS that was placed in the web page. The ads are separate resources from the web page in which they are placed, typically referenced as an HTML link in the web page. In-stream ads units are inserted into content objects—an operation that cannot be done by the browser or the DAS. Some media players receive a playlist of content objects to aggregate in-stream ad units and content objects for contiguous playback, but in other environments, media players are unable to process a playlist of multiple content objects.

In-stream ad units that are inserted into content objects before streaming to a content object player are done in a static fashion. Unlike the DAS that can dynamically move around display ad units to different sites and/or web pages, in-stream ad units cannot conventionally be placed in that way. Typically, slots for in-stream ad units are filled by providers of the content objects to stream the content object with preset in-stream ad units that are the same for all end users. For example, a web site hosting video would find an advertiser that would provide an in-stream ad unit to embed into a content object that is served from the web site such that all viewers would receive the same ads.

There are a variety of techniques to distribute and receive media data (e.g., audio files, video files, etc.) over a computer network. For example, podcasting is the distribution of media data, such as radio programs or music videos, over the Internet using World Wide Web (Web) feeds. Advertisers advertise on podcasts by placing advertisements in the distributed media data. For example, a listener may listen to a short radio announcement from an advertiser before the start of the radio program.

Currently, advertisements are manually combined with the media data such that the advertisements become a permanent part of the media data. For example, once the advertisement is placed at the start of the radio program, the advertisement will always play at the start of the radio program. An advertiser cannot change the advertisement to a different time or location within the radio program.

Furthermore, to determine the effectiveness of advertisements, advertisers typically track the number of times the advertisements are distributed or downloaded. A conventional tracking technique is to access the server logs to determine how many times the media data has been transmitted. However, accessing the server logs is inconvenient and the server logs cannot track when the advertisement was actually downloaded. Another conventional tracking technique is to attach a redirect (e.g., Universal Resource Locator (URL)) directed to a tracking service at the header of a response. Thus, instead of providing the media data, an URL to the media data is provided in the response. Every time the media data is requested, a client is redirected to the tracking service that tracks the number of times the advertisements are requested and provides the media data with the advertisements to the client. Therefore, to accurately track the advertisements, a redirect must be attached to every reference to the media file. Since there may be a large number of references to the media data across the Internet and because some of those references may be outside the control of the content owner, it is difficult to ensure that a redirect is attached to all requests. Thus, the attachment of redirects to track advertisements can be highly inaccurate.

As a result, there is a need for continuing efforts to improve the placement of advertisements or other contents on media data transmitted over a computer network.

SUMMARY

In one embodiment, a method and system for providing a content object with an in-stream ad unit inserted into the content object for a content object player is disclosed. The content object is audio and/or video. A media services platform (MSP) knows of one or more in-stream slots in the content object where in-stream ad units may be placed. The MSP queries a display ad server (DAS) to specify the in-stream ad unit, however the DAS does not natively support in-stream ad units in this embodiment. The MSP maps one or more in-stream slots in the content object to corresponding display ad locations. The MSP places the in-stream ad unit into the slot of the content object to create a processed content object. The MSP optionally transcodes the processed content object. The processed content object is downloaded or streamed to the content object player.

In one embodiment, a method for providing a content object with an in-stream ad unit inserted into the content object is disclosed, where the content object is audio and/or video. A content request for the content object from a content object player is received at a first location. The content object has a slot configured for insertion of the in-stream ad unit. The content request includes location information that is received at the first location, and identifies where the content object can be requested. An ad request for the in-stream ad unit is sent from the first location to an ad server at a second location, wherein the second location is away from the first location on the Internet. An indication of the in-stream ad unit to insert into the slot is received from the ad server. The in-stream ad unit is retrieved. The content object transmogrified to effect the placement of the in-stream ad unit into the slot of the content object to create a coded content object at the first location. Download or streaming of the coded content object from the first location with the in-stream ad unit placed into the slot is facilitated.

In one embodiment, a media services platform for providing a content object with an in-stream ad unit inserted into the content object is disclosed, where the content object is audio and/or video. The media services platform includes a first interface, a second interface, a computing system and a third interface. The first interface is configured to receive at a first location: a content request for the content object from a content object player, and location information that identifies where a content object can be retrieved. The second interface is configured to send an ad request for the in-stream ad unit from the first location to an ad server at a second location, where the second location is away from the first location on the Internet. The computing system is configured to: process indication of the in-stream ad unit to insert into the slot from the ad server, and automatically place the in-stream ad unit into the slot of the content object to create a coded content object at the first location. The third interface is configured to facilitate download or streaming of the coded content object from the first location with the in-stream ad unit placed into the slot.

In one embodiment, a method for providing a content object with an in-stream ad unit inserted into the content object, where the content object is audio and/or video. A content request for the content object from a content object player is processed at a first location where the content object has a slot configured for insertion of the in-stream ad unit.

Location information is processed at the first location that identifies where the content object can be retrieved. An indication of a slot within the content object for insertion of the in-stream ad unit is processed at the first location. An ad request for the in-stream ad unit is sent from the first location to an ad server at a second location, where the second location is away from the first location on the Internet. An indication of the in-stream ad unit to insert into the slot from the ad server is processed. The in-stream ad unit is automatically placed into the slot of the content object to create a coded content object at the first location. Download or streaming of the coded content object from the first location with the in-stream ad unit placed into the slot is facilitated.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

The embodiments described herein provide methods and systems for placing an advertisement or other content into media data transmissions for distribution across a computer network. In general, a server (e.g., World Wide Web (Web) server) retrieves an advertisement and inserts the advertisement into a transmission of media data (e.g., a Web feed). In some embodiments, as will be explained in more detail below, the placement of advertisement may be tracked by counting the number of placement requests transmitted by the server.

Figure 1A:
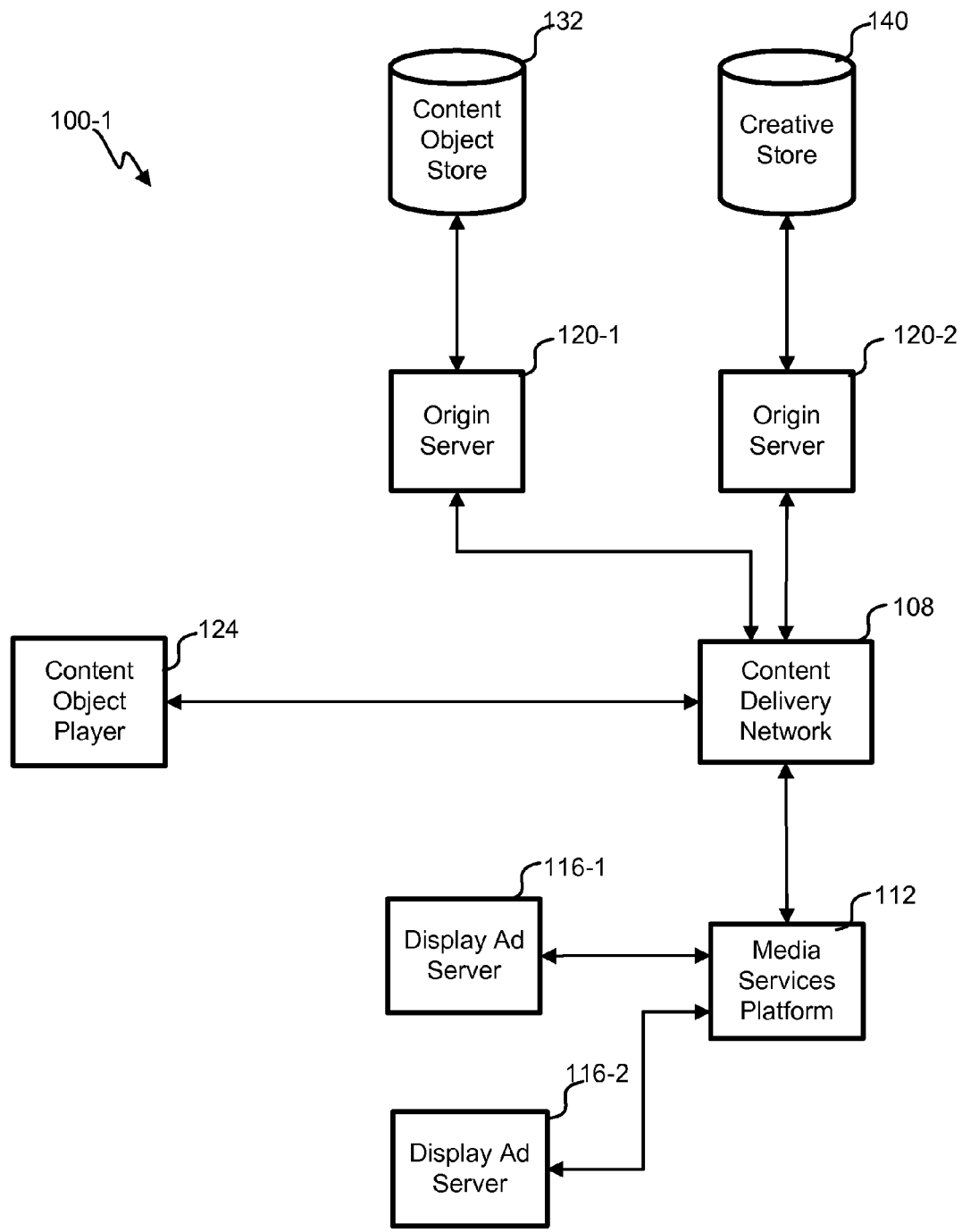
FIGS. 1A, 1B and 1C depict block diagrams of embodiments of a content object delivery system.

Referring initially to FIG. 1A, an embodiment of a content object delivery system 100-1 is shown. A media services platform (MSP) 112 in conjunction with one or more third-party display ad servers (DAS) 116 enable mapping between streamed/downloaded audio/video content objects (hereinafter "content objects") and in-stream ad units. In-stream ad units are inserted into content objects, where the in-stream ad unit could include audio, video, a still picture, a slide show, and/or an animation. Unlike conventional insertion of display ad units into web pages, this embodiment uses third-party DAS(s) 116 that are not designed to natively provide in-stream ad units for placement into content objects.

Although not shown, the various components in this and other block diagrams can be separated by networks that may even include public networks such as the Internet. For example, each DAS 116, the MSP 112, the content object player 124, each origin server, and/or the CDN 108 can be in separate locations coupled together with the Internet, a WAN and/or a LAN. In some cases, blocks can be collocated in the same location and can be integrated together. For example, a single server may perform as the MSP 112 and an origin server 120. The storage blocks 132, 140 are show as being separate, but can be combined or distributed in any fashion.

In this embodiment, the DAS 116 doesn't natively support placement of in-stream ad units within content objects. Requests for display ad units from the MSP 112 are believed to be to populate banner slots in a web page. Instead, the MSP 112 takes the single request for a content object from a content object player 124 and interacts with the one or more DAS 116 to fill slots in the content object with in-stream ad units specified by the one or more DAS 116. The process of preparing a content object with in-stream ad units and optional encoding by the MSP 112 is referred to herein as transmogrify. From the perspective of a DAS 116, the MSP 112 acts like an end user requesting display ad units to fill banner slots in a web page, but the MSP 112 is in fact filling slots in the content object with in-stream ad units. The content object is prepared with the slots filled with the in-stream ad units for return to the content object player 124 in response to the single request for the content object.

Different DAS 116 use different languages and protocols for filling banner slots with display ad units. For example, DoubleClick™ provides an application called DoubleClick™ for Publishers (DFP), Microsoft™ provides Atlas AdManager™ and 24/7 Real Media™ provides Open AdStream™ to serve display ads units dynamically for banner slots in web pages. Web pages have predetermined banner slots for display ad units, and an end user system, typically a web browser, conventionally interacts with the DAS 116 to fill those banner slots as the web page is rendered. The display ad units may invoke a media player to render a content object as part of the web page, but DAS 116 generally has no knowledge or control over the content object or how an in-stream ad unit is placed within the content object. Upon request, the DAS 116 merely provides the display ad unit or points the browser to a location to find the display ad unit. DAS 116 has no appreciation of in-stream ad units for insertion into content objects in this embodiment.

In this embodiment, the DAS 116 is used for providing links to specify in-stream ad units for insertion into content objects that are downloaded or streamed to a content object player 124 for the end user. The DAS 116 maps available in-stream ad units to requests from the MSP 112 to fill slots. The available in-stream ad units are specified to the DAS 116 when the ad campaign is designed. Tracking of the impressions experienced for the in-stream ad units is performed by the DAS 116 to allow metrics for an ad campaign.

The ad request sent from the MSP 112 to the DAS 116 are in the DFP format in this embodiment to indicate the slot to fill by remapping certain variables in the ad request. The DAS 116 responds by specifying an in-stream ad unit to insert into the slot in the content object typically with a link. For example, the link may specify a location that the in-stream ad unit named foo.mov could be retrieved for insertion by the MSP 112 at a mid-roll slot of a content object called video.mpg. In some cases, the DAS 116 may store the in-stream ad unit and provide it directly back to the MSP 112.

In this embodiment, the dimension variable or banner size for display ad units for DFP is repurposed to indicate to the DAS 116 where the slot is located such that the MSP 112 can insert the in-stream ad unit into the slot of the content object. For example, a 1×1 sized display ad unit in DFP is understood by the MSP 112 to indicate that the in-stream ad unit should be placed in a pre-roll slot, which means that the in-stream ad unit is placed at the beginning of the content object. The DAS provides a link to the appropriate in-stream ad unit in response to the request from the MSP 112. The MSP 112 requests the in-stream ad unit specified in the link from the DAS 116 and places the in-stream ad unit into the content object previously requested by the content object player 124. This process is repeated for any remaining the slots to return a content object to the content object player 124 with any number of in-stream ad units. From the single request for a content object by the content object player 124, the content object is returned with the proper in-stream ad units.

This embodiment uses one or more CDNs 108 that may include origin servers 120 and/or caching servers that provide content objects and/or in-stream ad units. This embodiment includes a content object store 132 and a creative store 140 respectively hosted by origin servers 120 of the CDN 108, but other embodiments could rely on the storage in the MSP 112, the DAS 116 and/or elsewhere on the Internet to store content objects and/or in-stream ad units. Instead of preinserting in-stream ad units into the content objects in anticipation of later requests, the MSP 112 in other embodiments may insert in-stream ad units into content objects as they are requested. In-stream ad units are placed into the content object before download or streamlining, but the entire automated editing process may not be complete before download or streaming to the content object player 124 begins.

The content object is provided to the MSP 112 from a content object store 132 in this embodiment. The content objects are accessible from an origin server 120-1 somewhere on the Internet. The origin servers 120 are the original source of content objects and/or in-stream ad units. In this embodiment, the content objects are hosted by the CDN 108. Other embodiments could place the content object store 132 anywhere that is accessible to the MSP 112. The content provider interacts with the CDN 108 to arrange hosting of the content objects to offload some or all of the hosting. Content objects are manually or automatically uploaded to the content object store 132 before requests for delivery.

This embodiment shows an origin server 120-2 hosted by a content delivery network (CDN) 108 that also includes a creative store 140 accessible from another origin server 120-1. In-stream ad units available for placement are stored in the creative store 140. There may be any number of creative stores 140 hosted by a CDN 108 or some other content provider. In this embodiment, the CDN 108 can deliver content objects from the MSP 112 using caching and streaming servers (not shown). Unique URIs, for example, can be used to differentiate various versions of the content object such that the cache supplies the proper in-stream ad unit encoded in appropriate bitrate, format, etc.

Through interaction with the MSP 112 and DAS 116, in-stream ad campaigns can be designed that use the DAS 116 to connect in-stream ad units to content objects for one or more content object players 124. The ad campaign designer specifies in-stream ad units for the ad campaign with the DAS 116 that will be returned by the DAS 116 when content objects are requested from MSP 112. The MSP 112 passes parameters to the DAS 116 that influence which in-stream ad unit links are returned for each slot, and those in-stream ad units are inserted into the content objects by the MSP 112 according to the placement preference. By interaction with the MSP 112, the designer can specify the parameters for the content object and the slot(s) that are available for filling with in-stream unit(s). The DAS 116 chooses the in-stream ad unit for the slot indicated available by the MSP 112.

The DAS 116 is designed to operate with display ad units and has no appreciation of placing in-stream ad units into various slots of content objects. The ad campaign designer interacts with the DAS 116 to specify the location (i.e., the link or URI) of in-stream ad units in the creative store 140 and situations or contexts where those in-stream ad unit might be specified to the MSP 112. Use of the display ad API of the DAS 116 allows this mapping even without native support in the API for in-stream ad units. Specifically, the display ad size is chosen in a unique way such that the MSP 112 can indicate to the DAS 116 the slot in the content object it wants to fill. The DAS 116 receives the display ad size and information characterizing the content object to decide which in-stream ad unit will fill the slot. This technique spoofs the existing API to have a DAS 116 work with in-stream ad units. Other embodiments could use a modified DAS that has an API that appreciates placement of in-stream ad units into various locations of content objects. In any event, the DAS 116 is a third party controlled server at a location other than the MSP 112 and/or CDN 108 that is specifying the in-stream ad unit for a slot or location in the content object on a slot-by-slot basis.

Although embodiments only show a single content object player 124 it is understood that there are a number of content object players 124. The content object player 124 can be any device that plays audio or video content objects, for example, a set top box, a media stream player, a wireless phone, a tablet, a kiosk, a laptop, an Internet radio, a movie theater projector, a video game system, a gaming machine, etc. The content object player 124 could request content for any number of different applications, for example, a web browser, a media player, a podcast application, a music player, an Internet radio application, etc. The content object player 124 requests a particular content object from the MSP 112 using a URI or other mechanism to specify the content object.

The request from the content object player could have parameters or attributes to specify preferred encoding format, bitrate, sampling rate, error correction, encryption preferred types of advertising or other parameters used by the MSP 112 to deliver the content objects and in-stream ad units. Other embodiments could imply the parameters or attributes when not express from the request by knowing information about the content object player 124. From the single request or URI from the content object player 124, the MSP 112 transmogrifies the content object to produce a content object that has in-stream ad units inserted along with possible other encoding. In this embodiment, the content object player 124 is not capable of transmogrifying and simply requests a content object that it plays.

Figure 1B:
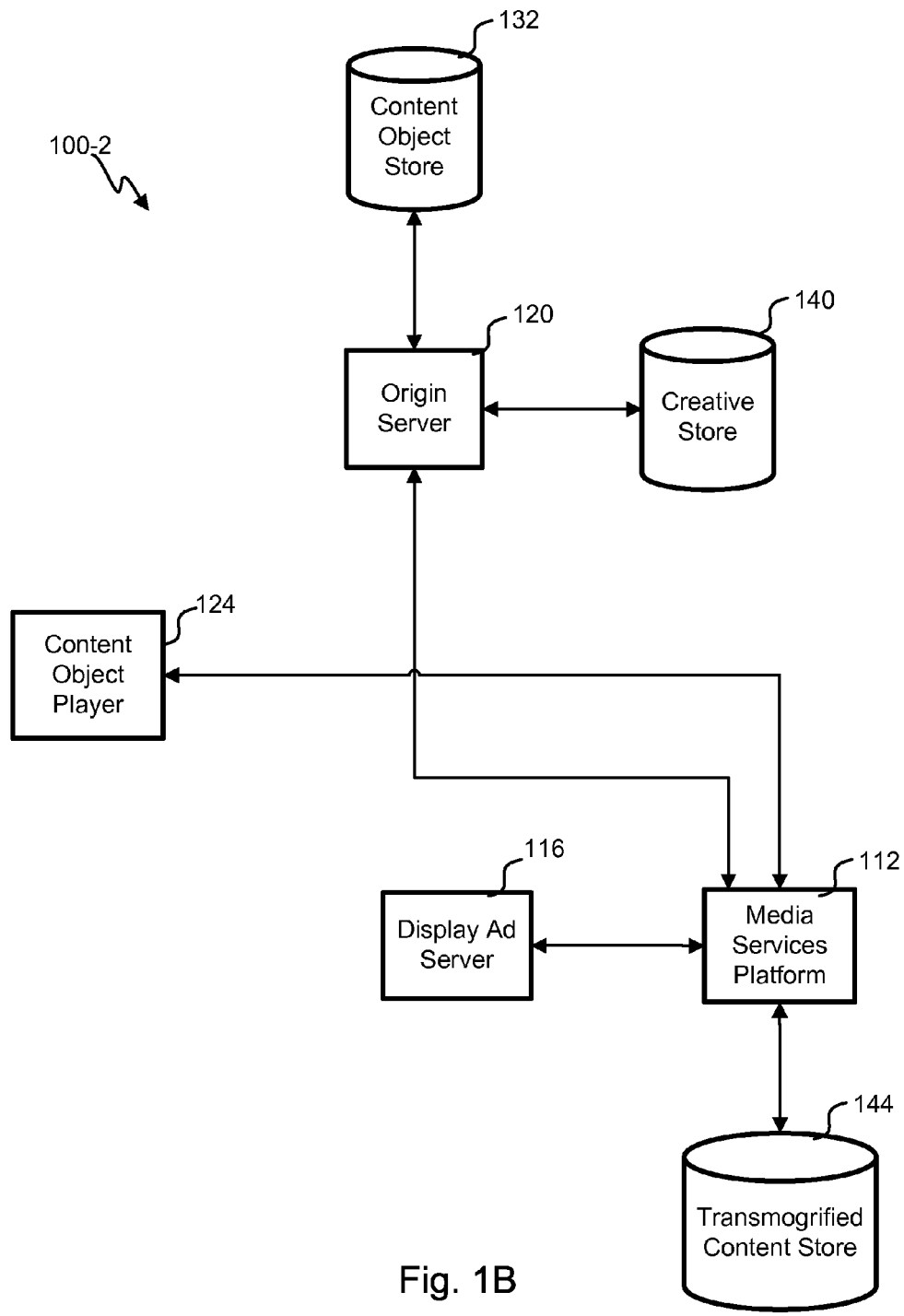

With reference to FIG. 1B, another embodiment of a content object delivery system 100-2 is shown. This embodiment does not use a CDN to assist in delivery. The content objects are downloaded by the MSP 112 from one or more origin servers 120 and transmogrified in anticipation of being requested. The in-stream ad units are specified in the ad campaign to be pre-roll, mid-roll or post-roll, or another in-stream location (e.g., 10%, 25%, 50%, 75%, or 85% complete). Rather than specifying the location to insert the in-stream ad unit as a percentage, other embodiments could specify an offset for insertion (e.g., 0, 5, 10, 15, 20, 30, 45, 50, or 60 minutes into each hour of the content object). The in-stream ad units are integrated into the content objects and stored in a transmogrified content store 144 coupled with or part of the MSP 112. There may be several versions of a particular content object with various in-stream ad units integrated in possibly different places in the content object encoded in many different ways.

The origin server 120 is located somewhere on the Internet and supplies the content objects and/or in-stream ad units to the MSP 112 through a manual or automatic process. There could be any number of origin servers 120 in various embodiments with some originating content objects and others originating in-stream ad units. This embodiment includes a content object store 132 that supplies content objects and a creative store 140 that supplies in-stream ad units through an origin server 120. When an in-stream ad campaign is designed through interaction with the DAS 116 and MSP 112, the in-stream ad units are gathered and placed into the content objects at predetermined locations in playback or slots. Various versions to support different coding for the possible attributes are also encoded. By transmogrifying in advance of user requests, requests from the content object players 124 can be fulfilled without additional delay in this embodiment.

Figure 1C:
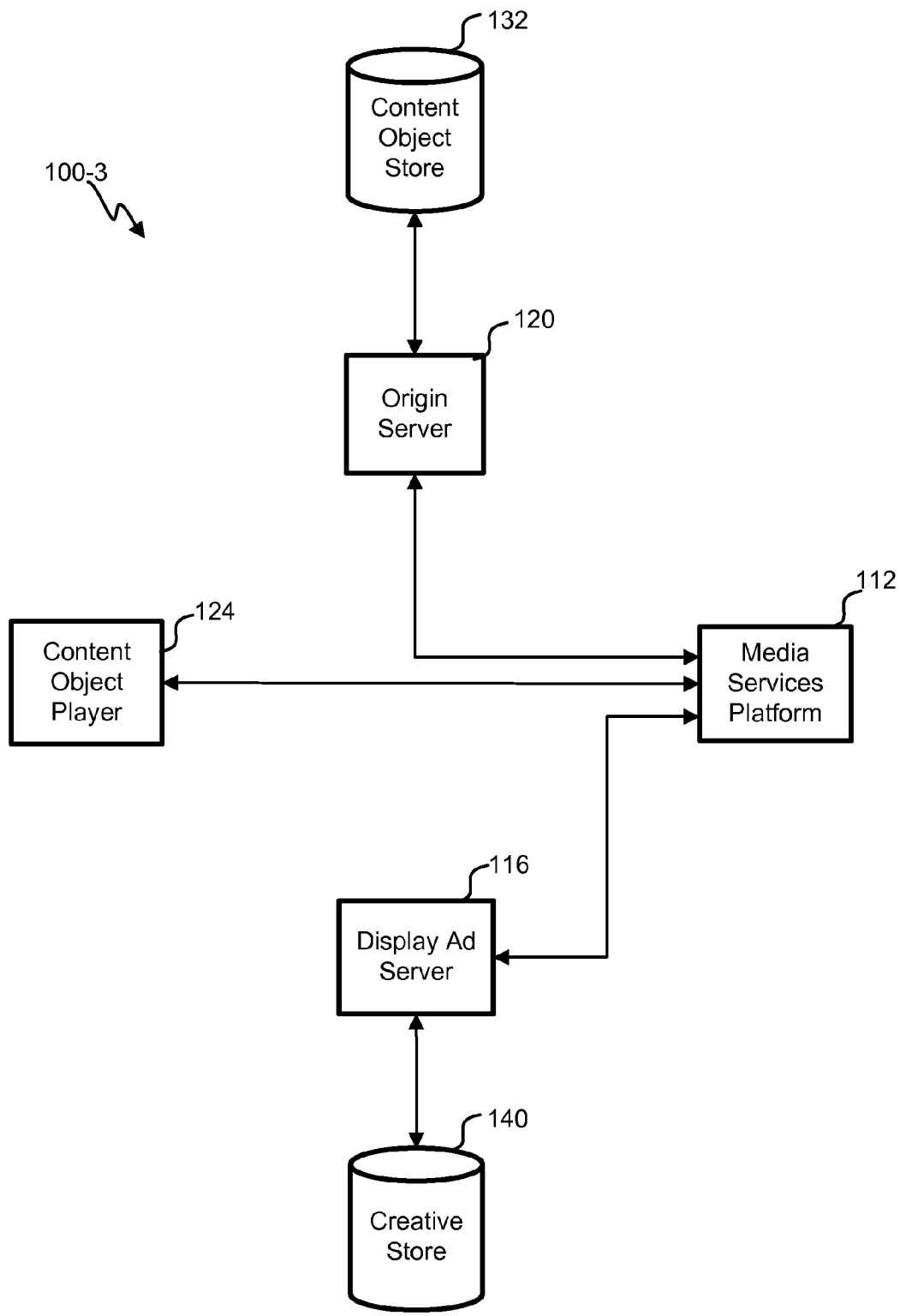

Referring next to FIG. 1C, another embodiment of a content object delivery system 100-3 is shown. This embodiment includes in the MSP 112 several other functions that accommodate real-time in-stream ad unit insertion for dynamic content object creation. Requests for content are received by the MSP 112, which queries the DAS 116 to find out which in-stream ad units to use to fill slots defined in the content object. The content object is transmogrified before returning it to the content object player 124 or as the content object is streaming to the content object player 124.

An encoding engine (not shown) is informed of the configuration of in-stream ad units and characteristics of the content object. The content object store retains a single master content object that can be transcoded to the bitrate and format for a particular request or could have multiple versions of each content object according to the different bitrates and formats. Similarly, a creative store 140 can have a single master or precoded variants for each in-stream ad unit. The encoding engine can place in-stream ad units into slots and optionally transcode on-the-fly such that the content object player 124 receives the content object with the proper in-stream ad units using the expected bitrate and format.

In this embodiment, the content object store 132 is hosted by an origin server 120 and the creative store 140 is hosted by the DAS 116, but they could be anywhere on the Internet in other embodiments. In one embodiment, a CDN 108 could be used to hold the in-stream ad units and content objects. The CDN 108 could additionally cache the content objects in their final transmogrified form with the in-stream ad units inserted. The same request for the content object configured in the same way could be served with a coded content object from the CDN without burdening resources on the MSP 112 unnecessarily.

Figure 2:
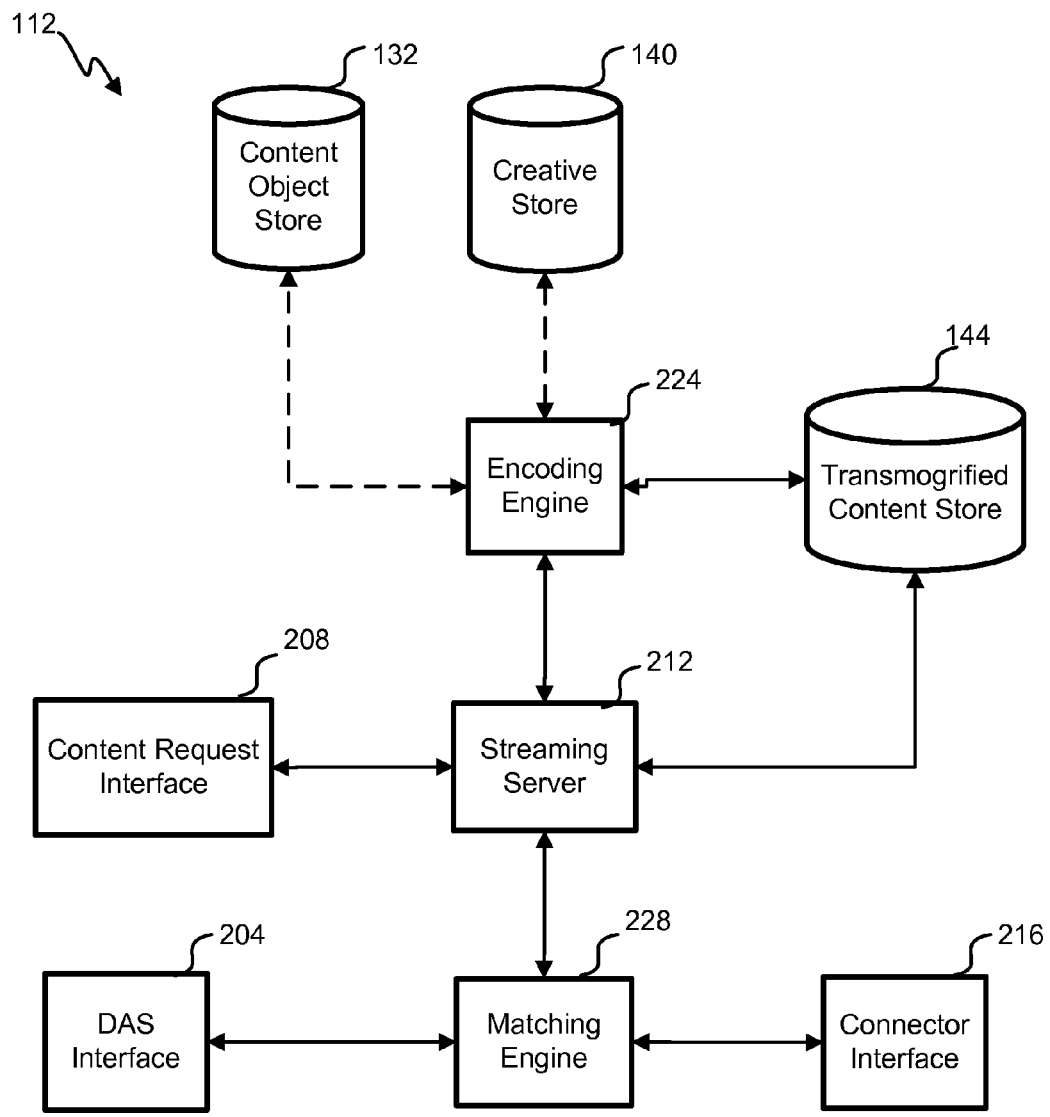
FIG. 2 depicts a block diagram of an embodiment of a media services platform (MSP)

With reference to FIG. 2, a block diagram of an embodiment of a MSP 112 is shown. The content object store 132 and creative store 140 are internal to the MSP 112 in this embodiment, but could be located within a CDN, hosted by a third-party, hosted by the DAS 116, or hosted by the content provider itself in other embodiments. Although the various blocks are shown separately, they can be implemented on one or more servers or combined in any way. The MSP 112 receives a request for a content object and performs any transmogrify before delivering the processed content object coded correctly with embedded in-stream ad units.

The DAS 116 specifies an in-stream ad unit for a particular slot that is retrieved creative store 140. The content object is held in the content object store 132 and are coded according to all the different configurations that are anticipated to be requested. For example, a particular in-stream ad unit may be inserted pre-roll, mid-roll, post-roll as the possible permutations such that three different coded content objects would be prepared and stored in the content object store 132. Pre-encoding can also be done for different content formats, bitrates and/or other parameters of the content object player 124. Additionally, there could be any number of different in-stream ad units in a particular slot resulting in still more versions of the content object.

The content objects and in-stream ad units are available to an encoding engine 136 that can transcode and insert them in-stream while streaming or downloading. Alternatively or additionally, the encoding engine 136 can precode different versions of each content object in different formats and with different in-stream ad units. When the connectors for an in-stream ad campaign are designed, the DAS 116 can be queried to determine the in-stream ad units in advance of request from content object players 124. Different content object versions to accommodate the various formats, bitrates and in-stream ad units can be created by the encoding engine 136 immediately after the content objects are identified. Where a particular configuration of coded content object is not already stored on the transmogrified content store 144, the encoding engine can code it on-the-fly as it is streamed or downloaded.

The various versions of each content object are stored in the transmogrified content store 144. Each coded content object corresponds to a different (or at least partially different) URI that might be provided to the MSP 112. The various transmogrified versions may be selected based upon information from the DAS 116, knowledge of the content object player capabilities, network conditions to the content object player 124, parameters in the URI, and the in-stream ad units selected by the DAS 116. The matching engine tells the streaming server 212 which transmogrified version to use. The transmogrified content store 144 may be hosted, mirrored and/or cached by a CDN 108 in other embodiments.

Registration of content objects is set up in several steps using the connector interface 216. Specifically, the content objects are specified through the connector interface 216 so that they can be later located typically with a URI. Additionally, categorization such as site and zone are specified for each of the content objects or for groups of content objects. Any hierarchy or categorization can be specified for content objects to provide sufficient granularity for the ad campaign designer to choose from. The mapping between in-stream slot locations within the content objects and display ad sizes is also specified in the connector interface 216. The content provider can decide the various locations within the content object that can have slots for insertion of in-stream ad units. Any location or number of commercial breaks can be accommodated for. Some slots can accommodate multiple in-stream ad units.

The matching engine 128 finds which in-stream ad units are to be inserted into the slots specified by the content provider. The slots are designed by the content provider or some other party or may be automatically specified in some embodiments. A query is made through a DAS interface 204 to the DAS 116 to find one or more in-stream ad units for a defined slot. Where there are a number of slots, there is a corresponding number of in-stream ad units or groups of in-stream ad units requested from the DAS 116. The DAS 116 is passed a display ad size and site and/or zone information for each slot. The ad campaign designer specifies the in-stream ad units to the DAS 116 for placement in specific slots and site and/zone information in a separate process. The DAS 116 plays matchmaker between slots in a content object and in-stream ad units even though the DAS 116 is not designed to supply in-stream ad units. The site and/or zone information influences the types of in-stream ad units will be placed in a particular content object.

The content object player 124 doesn't necessarily know anything about the process used to create a coded content object. Certain information may be specified by the content object player 124 to the content request interface 208 to allow choosing an appropriate format and bitrate and possibly allow better in-stream ad units to be inserted. The streaming server 212 is told the coded content object to retrieve from the transmogrified content store 144 and stream or download to the content object player 124 through the content request interface 208. In some embodiments, the content request interface 208, streaming server 212 and/or transmogrified content store 144 maybe within a CDN 108 to offload those functions from the MSP 112.

Figure 3:
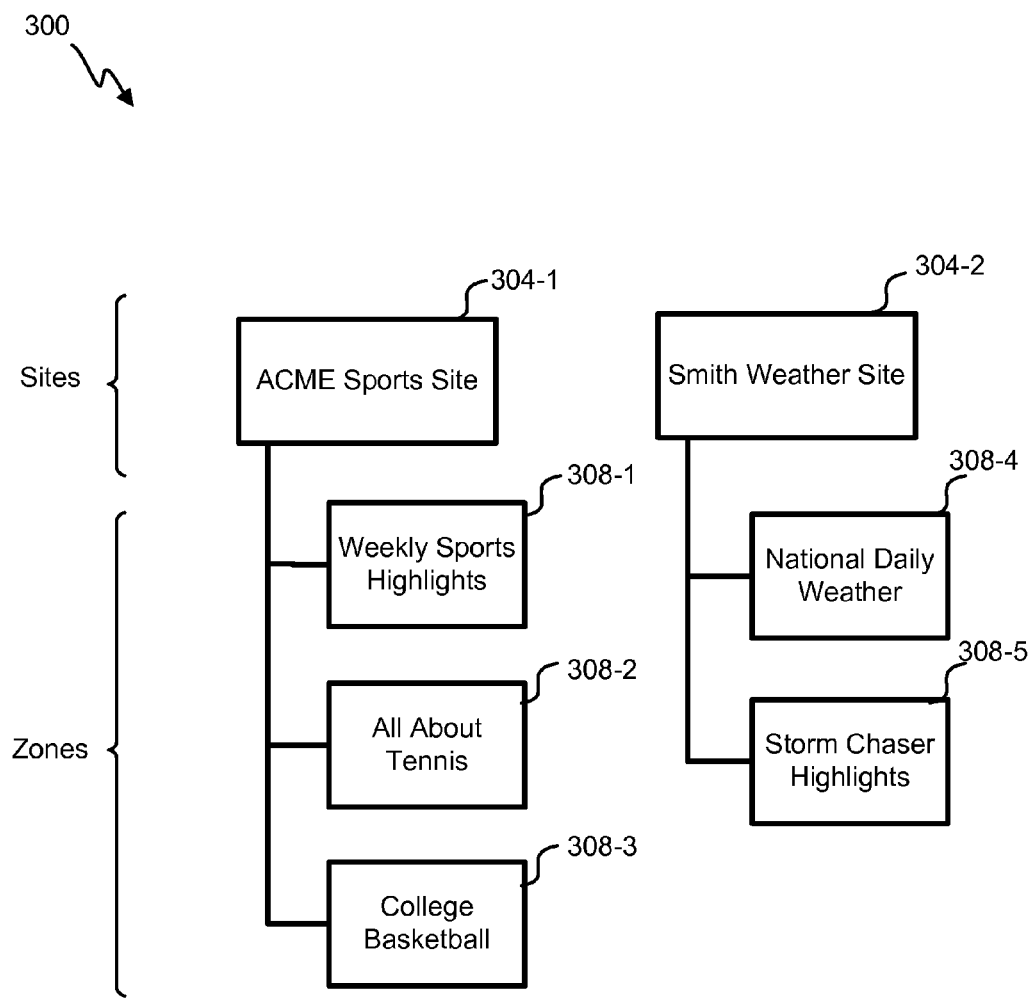
FIG. 3 depicts a diagram of an embodiment of a content characterization hierarchy.

Referring next to FIG. 3, a diagram of an embodiment of a content characterization hierarchy 300 is shown. Display ad campaigns are targeted to different web pages by the DAS 116. The possible places to run display ad units are categorized in different ways for different DASes. In this embodiment, the DAS appreciates web sites 304 that are defined by a domain and pages or groups of pages that make up a zone 308 within the site 304. In this way, a page called "all about tennis" defines a zone 308-2 where display ad units could be sold that might be attractive to viewers of that zone 308. Through site and zone, each content object or group of content objects can be categorized in a way that the ad campaign will recognize to provide an appropriate in-stream ad unit by the DAS 116. Campaign designers will specify sites and/or zones that have content objects that will be used to move their in-stream ad units.

Other embodiments could have other ways to describe or categorize a content object or groups of content objects. For example, the site 304 could specify a general category and the zone 308 specify a sub-category. For example, the XYZ News Channel could be the site 304 and the Nightly News Show be the zone 308. Granularity could be down to the individual content object, for example, the site 304 could be Nightly News Show on XYZ News Channel and the zone 308 could be today's episode. Any number of different hierarchy levels could be defined to accommodate any number of levels of sub-categorization. For example, there could be groups of similar content providers; groups of different programs; groups around a subject matter, person, event, genre, etc.; groups based upon content rating, genre, length of playback, etc. The granularity of the way in-stream ad slots might be sold through various hierarchy levels of categorization could accommodate many different embodiments in this way.

Figure 4A:
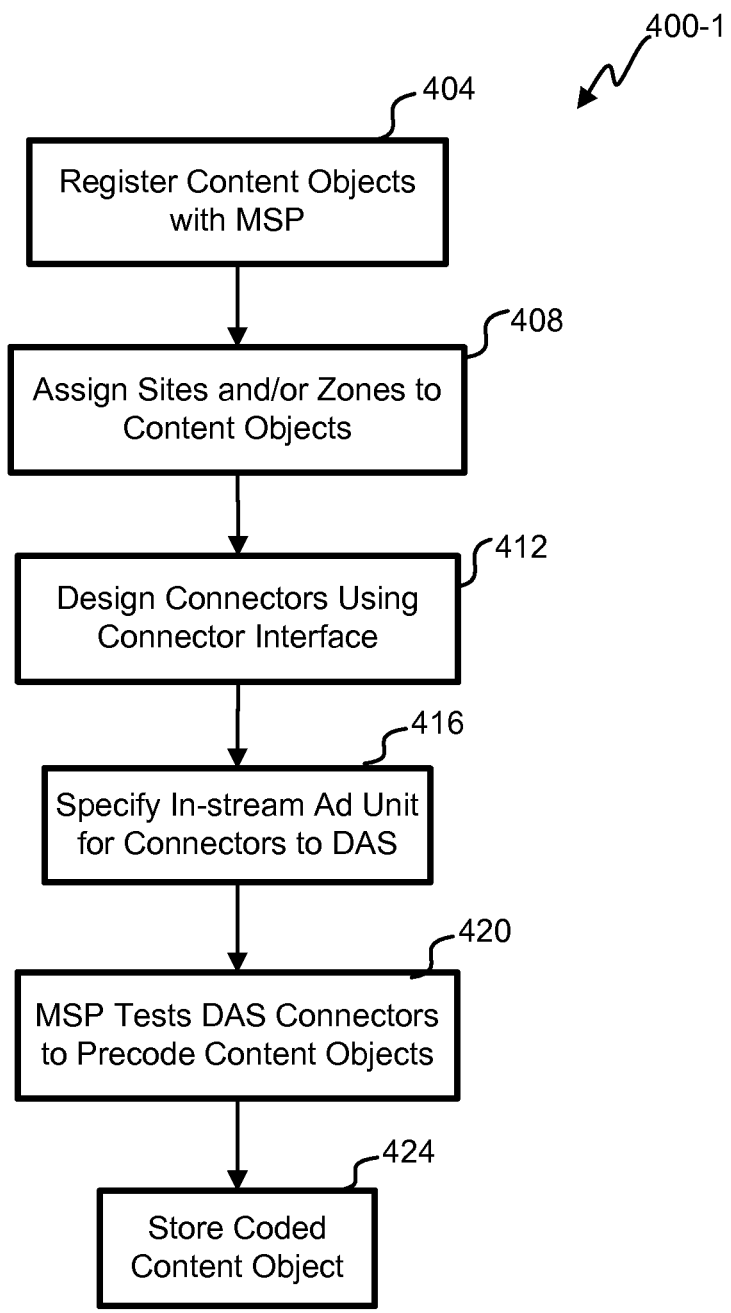
FIGS. 4A and 4B illustrate flowcharts of embodiments of a process for designing an audio and/or video ad campaign.

With reference to FIG. 4A, a flow chart of an embodiment of a process 400-1 for designing an in-stream ad campaign is shown. An ad campaign designer interacts with the DAS 116 and MSP 112 to configure an in-stream ad campaign in this embodiment. In some cases, it is the same party interacting with the DAS 116 and MSP 112, but in other cases, it is the content provider linking the content objects into the MSP 112 and an unrelated ad campaign designer seeing what content objects are available to configure the DAS 116 to fill the defined slots in the content objects. The depicted portion of the process 400-1 begins in block 404 where the content provider registers content objects MSP 112. The location where the content objects are hosted is specified to the MSP 112 which could be anywhere on the Internet, in a CDN 108 or even loaded into the MSP 112 for hosting. Some embodiments could automatically harvest the content objects by crawling specified sites.

The content objects are characterized by the content providers to allow choosing content intelligently for an in-stream ad campaign. In this embodiment, a site and/or a zone are assigned to each content object to characterize the content object in some way. In some cases, the mere location of the content object automatically characterizes the content object into site and zone. Any number of hierarchy or characterization parameters could be specified in different embodiments. Connectors are designed in block 412. A connector defines a slot within the content object that can have an in-stream ad unit inserted into. A place in the content object is chosen for the slot and a parameter that can be passed to the DAS 116 to indicate the slot. After indicating the content objects, characterizing the content objects and defining slots, the MSP 112 is ready to start filling in-stream slots and serving content objects with in-stream ad units.

In block 416, interaction with the DAS 116 begins. This part of the process could be performed by an unrelated party than the party from the preceding blocks. The DAS 116 has no appreciation of insertion of in-stream advertizing into content object, but the API to the DAS 116 is spoofed into implementing an in-stream ad campaign. The ad campaign designer is aware of the characteristics that would define individual content objects or groups of content objects. Additionally, the ad campaign designer knows the parameters that can be chosen to place in-stream ad units in different slots for content objects. In this embodiment, the parameter for the DAS 116 that defines the dimensions of a display ad is used to choose the slot in the content object. For example, a 1×5 sized display ad may correspond to a pre-roll slot for the in-stream ad unit in the content object. The ad campaign designer further defines the in-stream ad campaign specifying the characteristics of the content objects, slots to use, number of impressions, and other parameters.

In this embodiment, different versions of each content object is precoded in advance of requests. This can be performed for each permutation or just the most likely to be used. When a configuration of content object is encountered, but no precoded version exists, it could be transmogrified in real-time and saved for later requests. In block 420, the MSP 112 tests each connector for each slot for a content object to determine what the DAS 116 will specify for each slot. Once the in-stream ad units for each slot are known and gathered, a master version of the content object is created through in-stream placement of the in-stream ad units. That master version can be transcoded to support different formats and/or bitrates. The master version and the transcoded equivalents are stored in the transmogrified content store 144 in block 424. At this point, the MSP 112 is ready to serve precoded content without on-the-fly encoding.

Figure 4B:
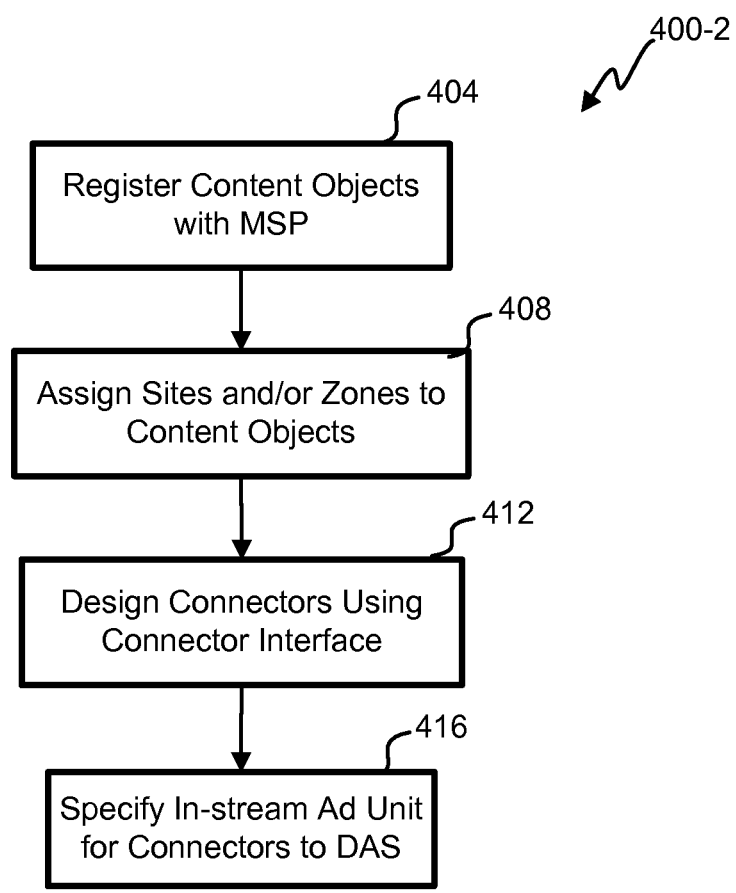

Referring next to FIG. 4B, a flow chart of another embodiment of a process 400-2 for designing an in-stream ad campaign is shown. This embodiment fills slots in the content object with in-stream ad units in real time while transcoding for the format and bitrate desired by the content object player 124. The process is generally the same as the embodiment in FIG. 4A, but block 420 and 424 are not used. The in-stream ad campaign involves specifying content objects, characterizing the content objects and defining slots with the MSP 112 before specifying the characteristics of the content objects, slots to use, number of impressions, and other parameters to the DAS 116. As each content object is requested during normal operation by a content object player 124, the coded content object is formulated and delivered. The coded content could be cached or stored to avoid encoding on-the-fly next time.

Figure 5A:
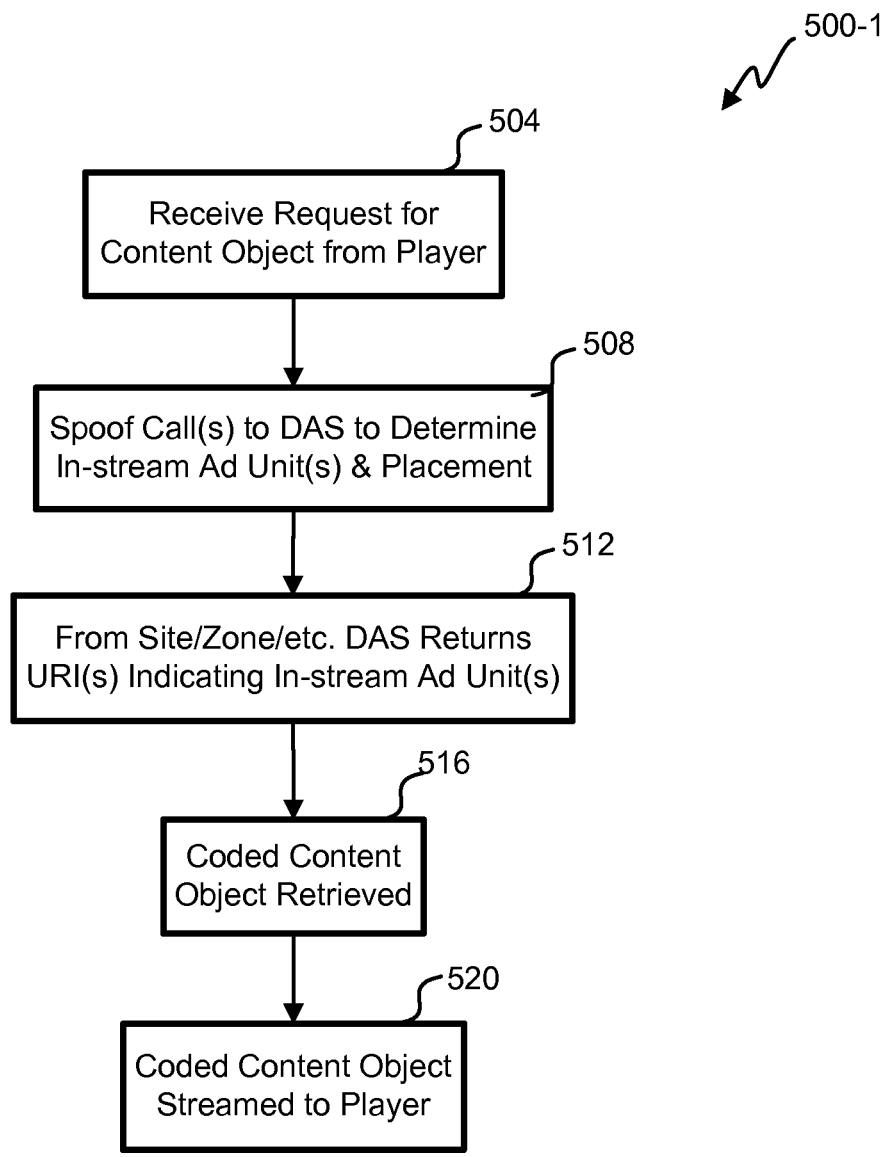
FIGS. 5A and 5B illustrate flowcharts of embodiments of a process for delivering a content object coded for a content object player with in-stream ad units inserted into the stream or download.

With reference to FIG. 5A, a flow chart of an embodiment of a process 500-1 for delivering a content object coded for a content object player 124 with in-stream ad units inserted into the stream or download is shown. This embodiment precodes and inserts in-stream ad units into the content objects, which are stored in the transmogrified content store 144 as described in relation to FIG. 4A above. The depicted portion of the process begins in block 504 where the MSP 112 receives a request for a content object. The request could be a URI or use some other API. Parameters to help characterize the requester are included in the request either in the URI, in a separate message or inferred from knowledge of the content object player 124.

This embodiment typically has the coded content objects prepared beforehand and stored by the MSP in a transmogrified content store 114. The request can be matched to a coded content object without any interaction with the DAS 116. Where there are no requests to the DAS 116, the ad campaign is not tracked by the DAS 116. Blocks 508 and 512 are performed, if for no other reason, to allow the DAS 116 to track in-stream ad placement. Other embodiments could track ad placement by query to the MSP 112 alone or the MSP 112 and DAS 116.

In block 508, the MSP 112 determines the slot(s) available in the content object for placement of an in-stream ad unit. Each slot has a separate call to the DAS 116 in this embodiment to find the appropriate in-stream ad unit. Other embodiments could have a single call to find a group of in-stream ad units for different slots in the content object. In one embodiment, multiple in-stream ad units can be used to fill a slot with a single call to the DAS 116.

In block 512, the DAS 116 receives a request for a in-stream ad unit in the form of a URI in this embodiment that spoofs the DAS 116 into specifying an in-stream ad unit and its placement in the content object. The MSP 112 further spoofs the DAS 112 into thinking the request came from the end user device. The DAS 116 receives characteristics in the form of site and/or zone along with a size of the display ad unit. With this information, the DAS 116 matches the request to a particular in-stream ad unit. The in-stream ad unit is specified by the DAS 116 in a URI that is passed back to the MSP 112. The URI indicates where the in-stream ad unit can be retrieved if not already loaded into the MSP 112.

Once the MSP 112 fills all the slots with potentially multiple calls to the DAS 116 in block 512, the MSP 112 can match the configuration of the content object to one that has been precoded and stored in the transmogrified content store 144. The coded content object is retrieved in block 516 from the transmogrified content store 144. The streaming server 212 delivers the precoded content object to the content object player in block 520.

Figure 5B:
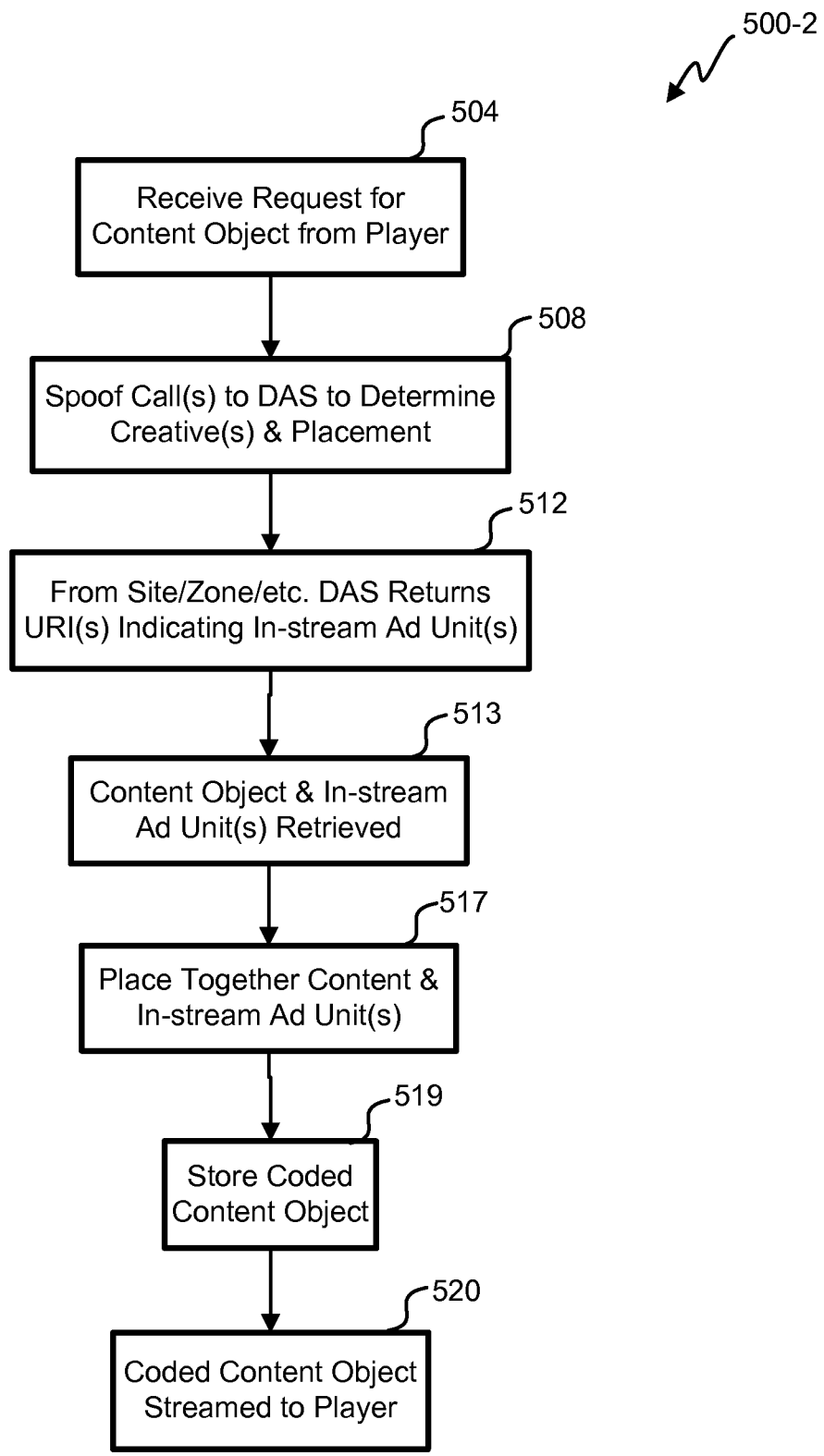

Referring next to FIG. 5B, a flow chart of an embodiment of a process 500-2 for delivering a content object coded for a content object player 124 with in-stream ad units inserted into the stream or download is shown. In this embodiment, the coded content object is created on-the-fly unless one is cached in accordance with the embodiment described in relation to FIG. 4B above. The depicted portion of the process largely mirrors the embodiment of FIG. 5A for blocks 504, 508 and 512, but inserts new blocks 513, 517 and 519 before block 520.

In block 513, the indicated in-stream ad units are retrieved from a location specified by the DAS 116 along with the content object requested by the content object player 124. In block 517, the in-stream ad units are placed into the content object along with any transcoding that might be performed to transmogrify the content object into a coded content object. The coded content object is stored in the transmogrified content store 144 in block 519. To fulfill the request, the coded content object is streamed or downloaded to the content object player 124 in block 520. Although shown as separate blocks, the creation, storage and delivery can be done at least partially simultaneously. For example, the coding and insertion can be performed as needed during the streaming of the content object. The stream is started as soon as the initial processing is performed and more processing is performed as the coded content object is spooled out to the content object player 124.

Figure 6:
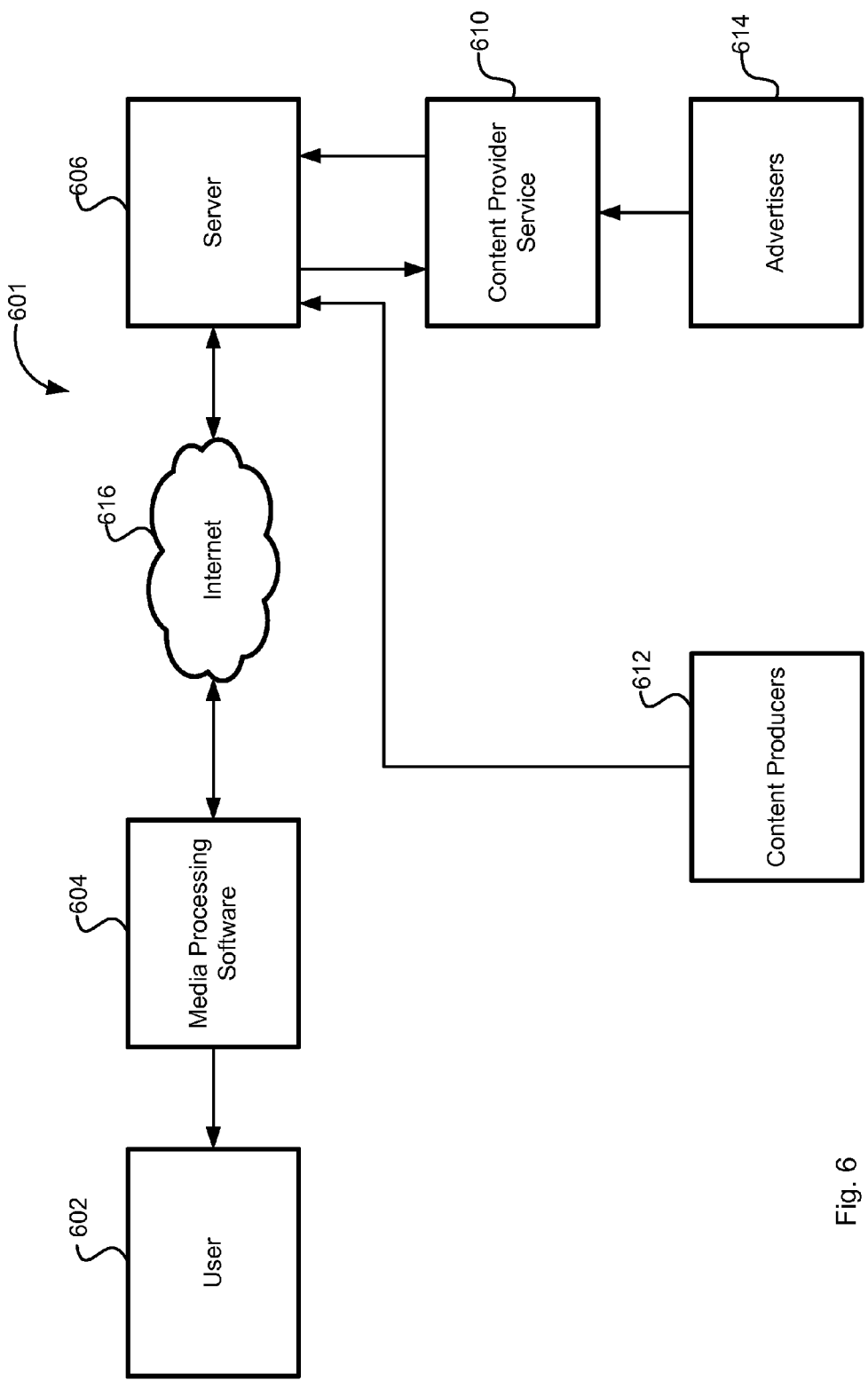
FIG. 6 is a simplified block diagram of a system for distributing media data, in accordance with an embodiment.

FIG. 6 is a simplified block diagram of a system for distributing media data, in accordance with an embodiment. As shown in FIG. 6, system 601 includes user 602, media processing software 604, server 606, content producers 612, content provider service 610, and advertisers 614. Content producers 612 create or produce media data for distribution to user 602. Media data includes audio, text, graphics, video, and other media. Media data may have a variety of attributes, such as media format, sampling rate, size, and other attributes. For example, media data may have a variety of media formats, and the media formats may be identified by data within the media data and/or by the filename extension. Exemplary media formats that may be associated with media data include MPEG-1 Audio Layer 3 (MP3), WAV (or WAVE), Advanced Audio Coding (AAC), Graphics Interchange Format (GIF), Joint Photographic Experts Group (JPEG), Moving Picture Experts Group (MPEG), Windows Media Audio (WMA) and other media formats. Additionally, in another example, the media data may have a variety of sampling rates (e.g., bit rates). Once content producers 612 create the media data for distribution, the media data may be uploaded to a hosting service that runs servers, such as server 606, allowing the media data to be distributed to user 602 by way of Internet 616, computer networks, or other communication channels.

Advertisers 614 or other content producers may want to insert other media data into the media data produced by content producers 612. For example, advertisers 614 may want to publicize their products or services to users 602 by inserting advertisements into the media data provided by content producers 612. Advertisers 614 create or produce media data and upload the media data to content provider service 610. Content provider service 610 allows advertisers 614 to manage the distribution of their media data. For example, advertisers 614 may use content provider service 610 to manage their advertising policy. Furthermore, content provider service 610 also transmits the media data provided by advertisers 614 to server 606 for distribution to user 602 by way of Internet 616. A variety of hosting services may host content provider service 610. For example, in some embodiments, content provider service 610 may be integrated into the content management tools that are hosted on a hosting service selected by advertisers 614. In addition to providing advertisers 614 with the ability to manage media data, content provider service 610 allows a large network of content producers 612 to have access to a large network of advertisers 614 and vice versa. For example, content producers 612 can search for one or more advertisers 614 though content provider service 610. With advertisers 614 located, content producers 612 may create an offer to the advertisers to carry the content (i.e., media data) provided by the advertisers. By way of content provider service 610, advertisers 614 may accept or reject the offer. In another example, an entity may be both content producers 612 and advertisers 614. In other words, both content producers 612 and advertisers 614 may be represented by the same entity. Here, for instance, the entity can use content provider service 610 to manage the advertisement sales of its advertisements. A sales organization within the entity could setup the advertisers and the entity may use content producers 612 both as content producers 612 and advertisers 614 to create and manage the advertisement campaigns.

Server 606 receives the media data provided by content producers 612 and by advertisers 614. It should be appreciated that server 606 is a computing device configured to execute software applications. Exemplary server 606 includes Web servers, FTP servers, and other servers. Server 606 hosts a filter module and, as will be explained in more detail below, the filter module may be configured to insert the media data provided by advertisers 614 into the media data provided by content producers 612. In other words, the filter module merges the media data provided by content producers 612 with the media data provided by advertisers 614.

After the insertion, server 606 transmits the merged media data to media processing software 604. Media processing software 604 receives or downloads the merged media data and is configured to render the merged media data onto speakers, displays, and other devices. Exemplary media processing software 604 includes Windows Media Player, iTunes, WinAmp, iPodder, and other media processing software. Media processing software 604 may receive merged media data by way of Internet 616, computer networks, or other communication channels. For example, in an embodiment, server 606 may transmit the merged media data to media processing software 604 by way of Internet 616 using HyperText Transfer Protocol (HTTP), File Transfer Protocol (FTP), Voice over Internet Protocol (VoIP), or other communication protocols.

Figure 7:
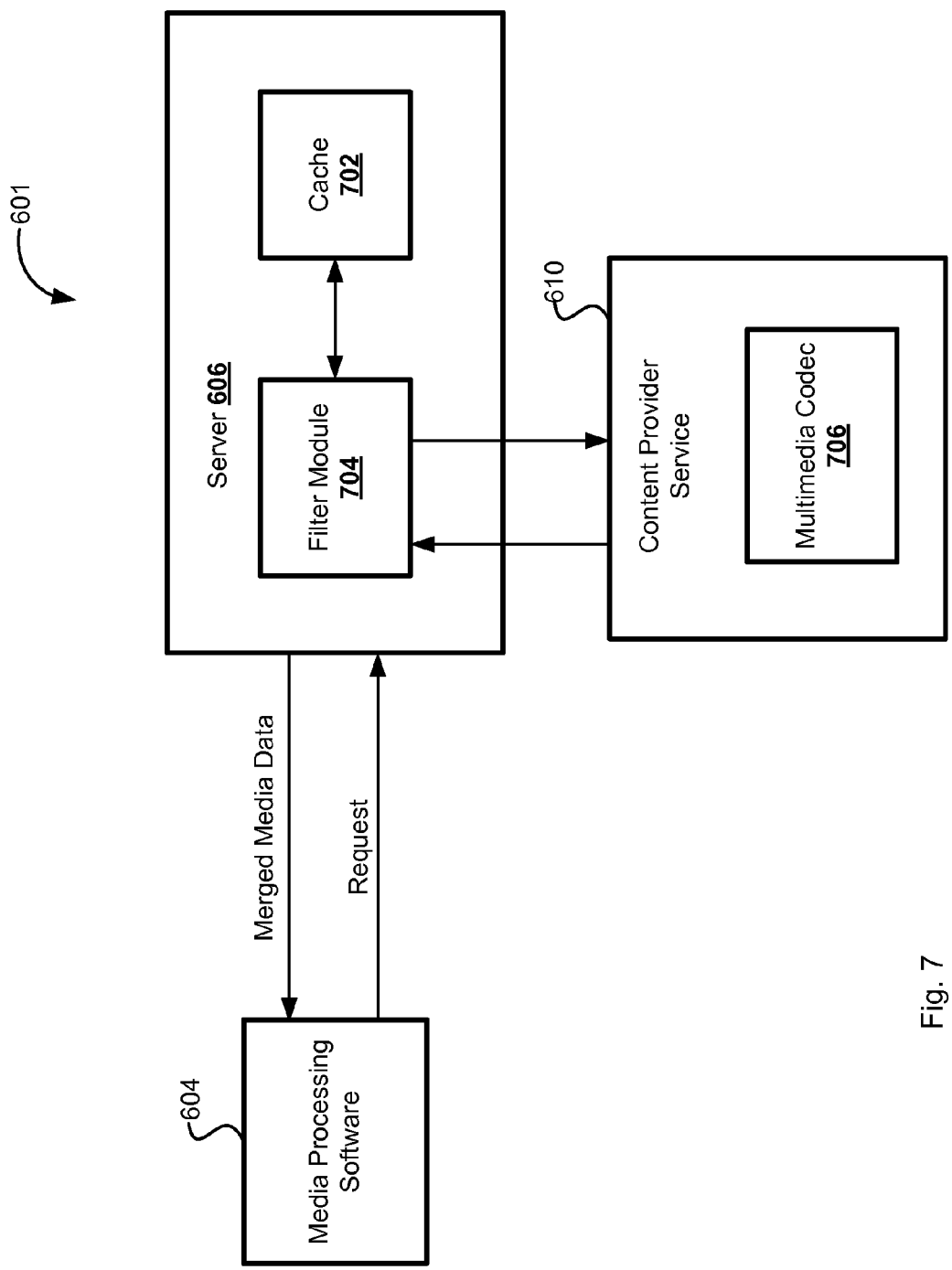
FIG. 7 is a detailed block diagram of the server and content provider service shown in FIG. 6, in accordance with an embodiment.

FIG. 7 is a detailed block diagram of the server and content provider service shown in FIG. 6, in accordance with an embodiment. As shown in FIG. 7, system 601 includes media processing software 604, server 606, and content provider service 610. As discussed above, content producers transmit media data to server 606 for distribution. To download the media data provided by content producers from server 606, media processing software 604 transmits a request for the media data to the server. Before transmitting the media data provided by content producers to media processing software 604, server 606 transmits the media data to filter module 704. In general, as will be explained in more detail below, filter module 704 may be configured to merge the media data provided by content producers with the media data provided by advertisers and/or configured to direct the merge operation. In an embodiment, filter module 704 may retrieve the media data provided by advertisers from content provider service 610. In another embodiment, filter module 704 may retrieve the media data provided by advertisers from cache 702. Filter module 704 then transmits the merged media data to server 606 for distribution to media processing software 604. In some embodiments, a static caching network (e.g., a Content Delivery Network) may be used to distribute the merged media data to media processing software 604. Here, filter module 704 is operated on an origin server (not shown) external to the static caching network. The origin server may direct the operation of the static caching network to serve (and cache) the merged media data as determined by content provider service 610.

In general, as will be explained in more detail below, content provider service 610 identifies the media data provided by advertisers to be inserted into the media data provided by the content producers. Content provider service 610 transmits the identification in a placement response to a placement request made by filter module 704. Content provider service 610 may also transmit the media data provided by advertisers to filter module 704. In some embodiments, content provider service 610 may additionally include multimedia codec 706 to encode and/or decode media data provided by advertisers into different media formats, sizes, and/or sample rates as requested by server 606.

Figure 8:
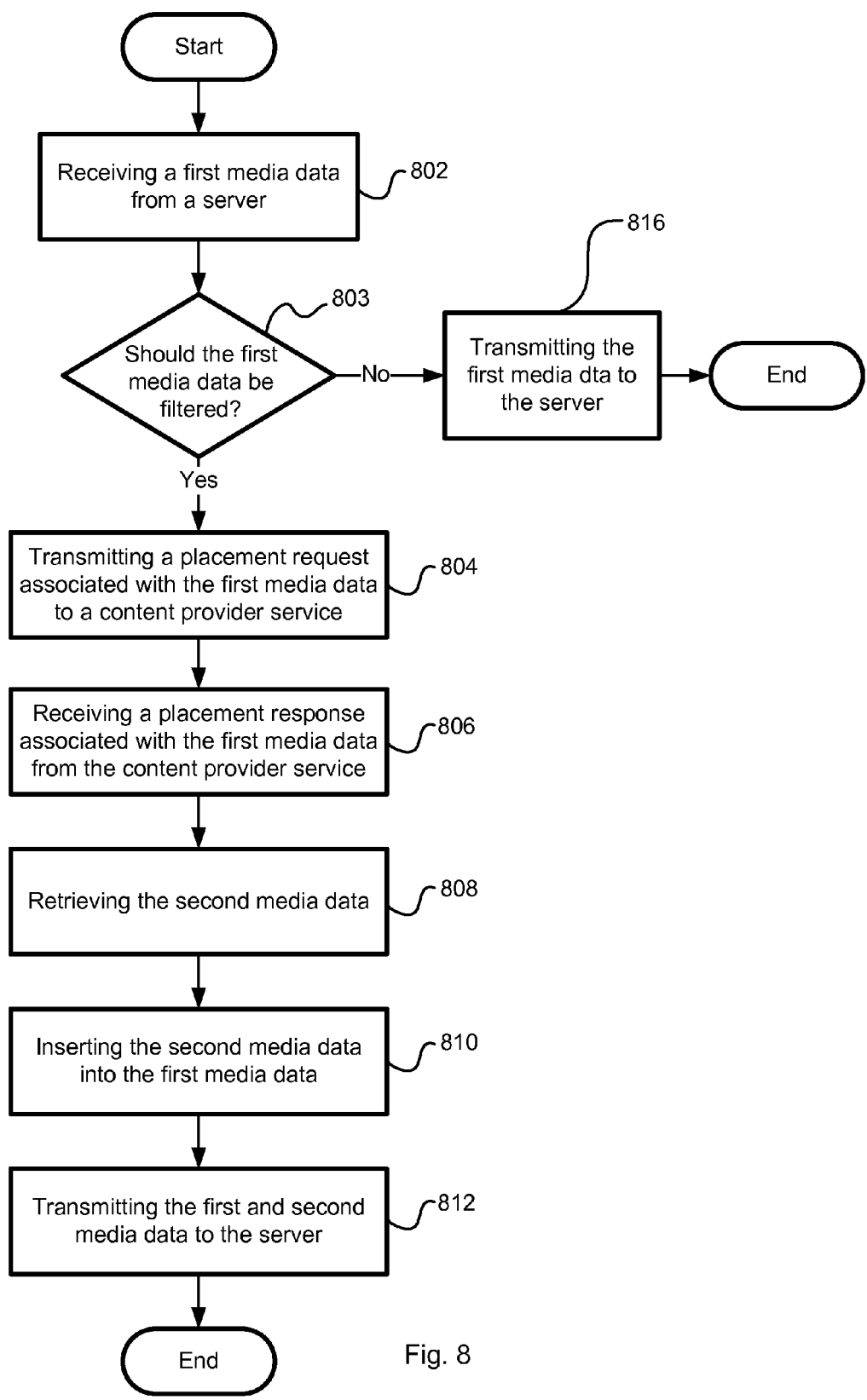
FIG. 8 is a flowchart diagram of the filter module processing media data, in accordance with an embodiment.

FIG. 8 is a flowchart diagram of the filter module processing media data, in accordance with an embodiment. As discussed above, a server hosts a filter module that is configured to merge media data. Before the server transmits media data provided by content providers (hereafter "first media data") for distribution, the server transmits the first media data to the filter module. As shown in FIG. 8, filter module receives the first media data from the server in operation 802. The filter module analyzes the request (e.g., HTTP request) for the first media data received by the server to determine, in operation 803, whether the request matches one or more criteria that indicate the first media data is to be filtered. If the first media data does not match the criteria, the filter module transmits the unmodified first media data to the server in operation 816 for distribution. For example, the filtering criteria may be based on pattern matching against the URL (e.g., http://match*/something[a-z]here/*) against the location of the file on the computer readable media (e.g., everything in C:/podcasts) and/or based on media format (e.g., filter audio/* and video/mpeg).

On the other hand, if the first media does match the criteria, the filter module transmits a placement request to the content provider service in operation 804. In some embodiments, the placement request may be an HTTP request, where the server can serve as an HTTP client, and the content provider service can serve as an HTTP server. The server and the content provider service may communicate, for example, with Representational State Transfer (REST) or Simple Object Access Protocol (SOAP). The placement request may include identification and/or authentication data that identify the content producers, listeners, listener locations, and other identification and/or authentication data. The placement request may additionally include data identifying the first media data. For example, the data identifying the first media data may be a list of entries based on the contents of the first media data (e.g., Extensible Markup Language (XML) feed) requested by the media processing software. The entries may include an article link URL that refers to the text/html article for the first media data. For instance, with RSS 2.0, the article may correspond to the contents of the <link> element of an <item> element, which uniquely identifies the entries. In another example, the entries may include a content link URL that refers to MP3 data or other media formats, such as WMA. With RSS 2.0, the content link URL may correspond to an <enclosure> element. In still another example, the entries may include a content type that is a text field defining the media format of the file referred to by the content link. For instance, the text field may include "audio/mpeg" for first media data with an MP3 media format. In RSS 2.0, the content type may correspond to the <enclosure> element.

As a result of the placement request, in operation 806, the filter module receives a placement response associated with the first media from the content provider service. In some embodiments, as will be explained in more detail below, the placement response may include data that identifies the media data provided by advertisers or other content providers (hereafter "second media data") associated with the first media data. The placement response may also include other identification and/or authentication data. With the information included in the placement response (e.g., data identifying the second media data and identification and/or authentication data), the filter module retrieves the second media data in operation 808. In an embodiment, the filter module may send a content request for the second media data to the content provider service. In response, the content provider service retrieves the second media data stored at the content provider service and transmits the second media data to the server. Alternatively, in another embodiment, the filter module may first check whether the second media data has been previously retrieved and stored in a cache, for example, the cache associated with the server shown in FIG. 7. If the second media data is stored in the cache, then the filter module retrieves the second media data from the cache. However, if the second media data is not stored in the cache, then the filter module transmits the content request for the second media data to the content provider service.

Thereafter, in operation 810, the filter module may insert the second media data into the first media data at the location associated with the first media data. In other words, in an embodiment, the filter module merges the first media data with the second media data. It should be appreciated that, in an embodiment, the second media data may be inserted into the first media data such that the second media data interrupts the first media data. For example, a still picture that is inserted and that interrupts the action of a video. In another embodiment, the second media data may be inserted into the first media data such that the second media data becomes a portion of the first media data. For example, scrolling text may be inserted into a portion of a video. In another example, a semi-transparent logo may be inserted as an overlay at a corner portion of a picture.

The second media data may be inserted at the beginning of the first media data, inserted at the end of the first media data, or inserted at a location between the beginning and the end of the first media data. To insert the second media data at the beginning or at the end of the first media data, the filter module concatenates together the first media data and the second media data. In an embodiment, a period of silence (e.g., one second) may be inserted between the first media data and the second media data to differentiate the second media data from the first media data.

To insert the second media data at a location between the beginning and the end of the first media data, a variety of insertion techniques may be used. For example, a quiet space detection technique may be used. With quiet space detection, a location associated with the first media data, which is included in the response, is initially located. The location may be, for example, identified by the span of time associated with the first media data (e.g., every ten minutes, at twenty seconds, and other time) and/or length associated with the first media data (e.g., at two bytes, at 2000 kilobytes). From this location associated with the first media data, two imaginary pointers are extended from the beginning of the of the first media data to the end of the first media data. Thereafter, each pointer is extended outwards from the location by a certain number of bytes corresponding to a time range, for example, one half second in each direction, which would create a window of one second.

If the maximum volume of the first media data within this window is below a specified threshold, then the first media data within this window may be a quiet space designated for the second media data, and the second media data may be inserted in the middle of the window. A specified time may be inserted at the ends of the second media data, for example, one half second of silence at both ends of the second media data. However, if the maximum volume within the window exceeds the specified threshold, then the window is moved towards both the beginning and the end of the first media data until the maximum program volume of the window is below the specified threshold. At this location, the second media data is inserted. If the window has moved more than a specified time and the maximum program volume is still greater than the specified threshold, then the second media data is not inserted into the first media data.

Another exemplary approach to insert the second media data at a location between the beginning and the end of the first media data is the explicit marker approach. With the explicit marker approach, the location within the first media data can be marked where the second media data can be inserted. A variety of marking techniques may be used. For example, first media data can include metadata tags that can indicate locations (e.g., via byte offset) where second media data can be inserted. For instance, with MP3-based first media data, locations may be stored in custom ID3 tags. Another exemplary marking technique includes signature byte markers where a sequence of bytes that identifies the location of insertion may be inserted into the first media data.

If the first media data includes metadata (e.g., ID3v1 or ID3v2 tags on MP3 files), the metadata can be preserved in the insertion operation. On the other hand, the metadata associated with the second media data may be erased when inserted into the first media data. It should be appreciated that, in another embodiment, the filter module may delegate or direct the insertion operation to another software module (e.g., an insertion module) or computing device configured to insert the second media data into the first media data. For example, in an embodiment, the filter module may transmit both the first media data and the second media data to the insertion module for insertion operations. After insertion, the insertion module transmits the first and second media data (i.e., merged media data) to the filter module. In another exemplary embodiment, the filter module may receive data identifying a location of the first media data (e.g., URL, pointers, and other location identifiers) from the server and receive data identifying a location of the first media data from the placement response. The filter module then transmits the data identifying the locations of the first media data and the second media data to the insertion module. The insertion module retrieves the first media data and second media data based on the data identifying the locations of the first media data and the second media data. Thereafter, the insertion module merges the first media data with the second media data and transmits the merged media data to the filter module. The filter module then transmits the merged media data to the server in operation 812. The server subsequently transmits the merged media data to a media processing software.

Figure 9:
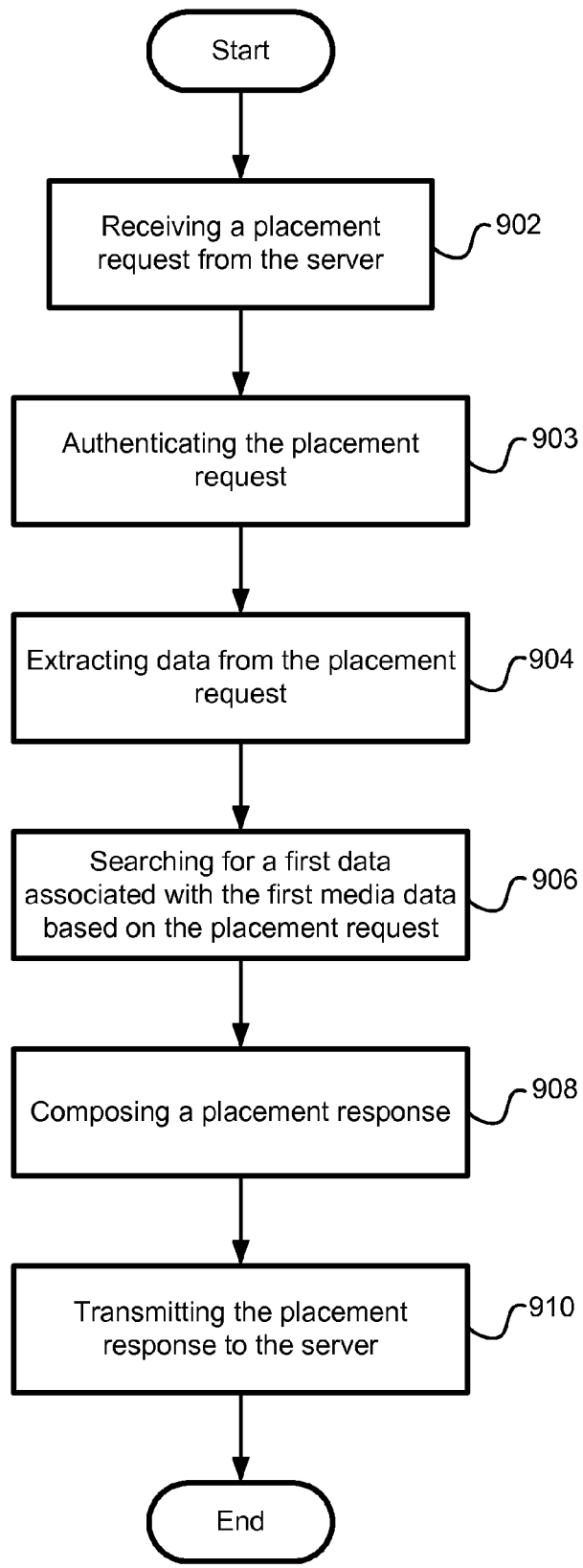
FIG. 9 is a flowchart diagram of the content provider service processing a placement request from a server, in accordance with an embodiment.

FIG. 9 is a flowchart diagram of the content provider service processing a placement request from a server, in accordance with an embodiment. In general, content provider service transmits the media data provided by advertisers to server for distribution and additionally allows advertisers to manage their media data. As shown in FIG. 9, in operation 902, the content provider service receives a placement request from the server. As discussed above, the placement request may include identification and/or authentication data that identify the content producers. The placement request may additionally include data identifying the media data provided by the content producers (hereafter "first media data") that are requested. In an embodiment, the placement request may be authenticated in operation 903. An exemplary authentication operation may include authenticating whether the placement request originated from authorized content producers. If the placement request cannot be validated, then the content provider service may transmit an error response to the server.

The content service provider receives the placement request when media processing software requests the first media data. Therefore, in some embodiments, the number of placement requests received from the server may be tracked. In other words, the content provider service may store a count of the number of placement requests received. The number of placement requests received may correspond to the number of advertisements placed. Accordingly, tracking the number of placement requests can correspond to tracking the number of advertisements placed. Furthermore, the filter module can detect when a transmission (or download) to the media processing software is complete or incomplete. In other words, the filter module can detect when the first and second media data are not completely transferred to the media processing software. If the transmission is incomplete, the filter module can request the content provider service to reduce or subtract the count of the number of placement requests received. The reduction of the count may be dependent on the particulars of the placement requests. For example, if the HTTP header identifies that a Flash-based player is requesting the first media data, and enough bytes have been transmitted such that the Flash-based player had played an advertisement (i.e., second media data) appearing at the beginning of the first media data, then the filter module may not transmit the request to reduce the count. On the other hand, if a Web browser was requesting the first media data, the Web browser would delete an incomplete first media data. Accordingly, the filter module may transmit a request to reduce the count for incomplete transmissions to Web browsers. In response to the request, the content provider service may reduce the count of the number of placement requests received.

After authentication, the content provider service extracts data (e.g., data identifying the first media data) from the placement request in operation 904. In an embodiment, the content provider service then searches for data that are associated with the first media data in operation 906 based on the data extracted from the request. In another embodiment, the content provider service may also search for data that are associated with other identification and/or authentication data included in the placement response. For example, data may include data identifying media data provided by advertisers (hereinafter "second media data") that may be inserted into the first media data. Another exemplary data may include a location associated with the first media data.

Thereafter, a placement response is composed in operation 908. In some embodiments, the placement response may be composed by formatting the data identifying the second media data and the location associated with the first media data into the placement response. The placement response may include a list of entries where each entry can include data identifying the second media data. For example, data can include a second media data identifier that uniquely identifies the second media data within the content provider service. The entry may additionally include the location associated with the first media data. For instance, a location code that indicates the time associated with the first media data where the second media data is to be inserted within the first media data. With the placement response composed, the content provider service transmits the placement response to the server in operation 910.

Figure 10:
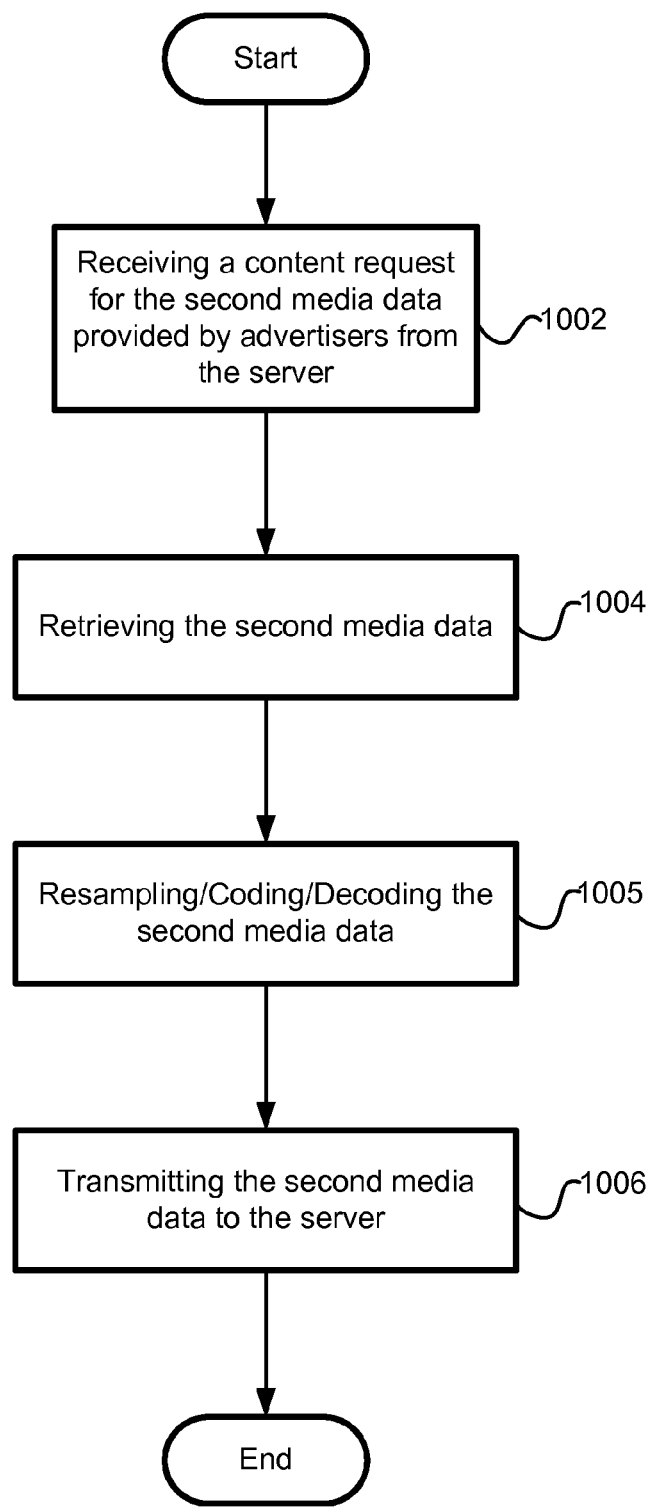
FIG. 10 is a flowchart diagram of the content provider service processing a content request from a server, in accordance with an embodiment.

FIG. 10 is a flowchart diagram of the content provider service processing a content request from a server, in accordance with an embodiment. As discussed above, the server may transmit a content request for media data provided by advertisers (hereinafter "second media data"). The content request may include data identifying the second media data and requested attributes (e.g., media format, sampling rate, size, and other attributes) associated with the second media data. As shown in FIG. 10, the content service provider receives the content request in operation 1002. The content service provider parses the content request to extract data, such as data identifying the second media data and requested attributes. Thereafter, in operation 1004, the content service provider retrieves the second media data.

In some embodiments, the attributes associated with the second media data can match the attributes associated with the media data provided by content providers (hereinafter "first media data"). If the attributes are different, then the second media data may be resampled, converted, decoded, and/or coded in operation 1005 to match the attribute of the first media data. For example, the second media data may be resampled to match the bit-rate of the first media data. In another example, to match the media format of the first media data, the second media data may be recoded to MP3 format. It should be appreciated that a variety of known multimedia codecs, such as the multimedia codec of FIG. 7, may be included in the content service provider to resample/decode/encode the second media data. In another embodiment, the filter module may also include codecs to resample/decode/encode the second media data. Still referring to FIG. 10, after the second media data is retrieved, the content provider service transmits the second media data to the server in operation 1006.

Figure 11:
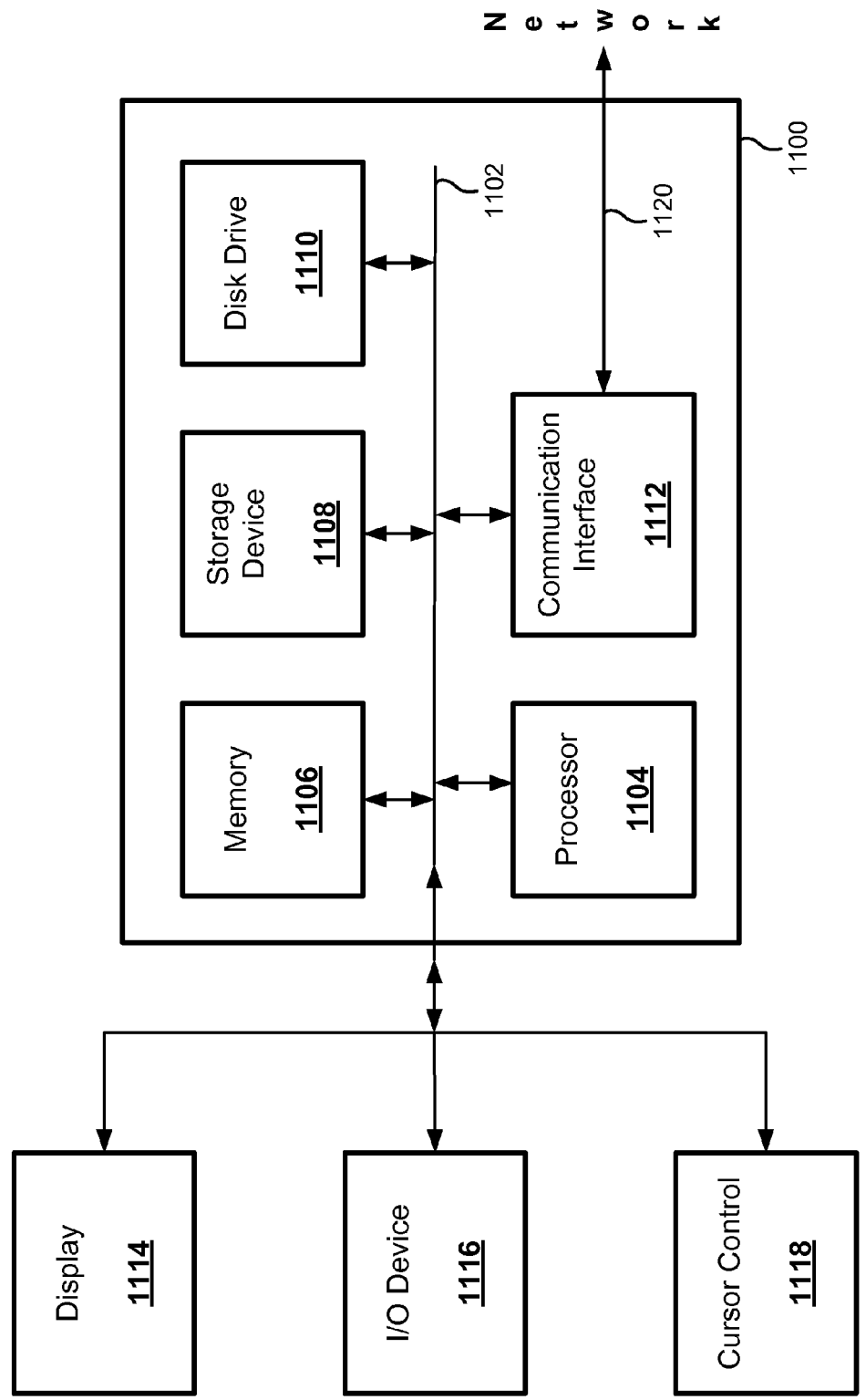
FIG. 11 is a block diagram illustrating an exemplary computer system suitable for the distribution of media data, in accordance with an embodiment.

FIG. 11 is a block diagram illustrating an exemplary computer system suitable for the distribution of media data, in accordance with an embodiment. In some embodiments, computer system 1100 may be used to implement computer programs, applications, methods, processes, or other software to perform the above-described techniques. Computer system 1100 includes a bus 1102 or other communication mechanism for communicating information, which interconnects subsystems and devices, such as processor 1104, system memory 1106 (e.g., RAM), storage device 1108 (e.g., ROM), disk drive 1110 (e.g., magnetic or optical), communication interface 1112 (e.g., modem or Ethernet card), display 1114 (e.g., CRT or LCD), input device 1116 (e.g., keyboard), and cursor control 1118 (e.g., mouse or trackball).

According to some embodiments of the invention, computer system 1100 performs specific operations by processor 1104 executing one or more sequences of one or more instructions stored in system memory 1106. Such instructions may be read into system memory 1106 from another computer readable medium, such as static storage device 1108 or disk drive 1110. In some embodiments, hard-wired circuitry may be used in place of or in combination with software instructions to implement the invention.

Various embodiments may be implemented in numerous ways, including as a system, a process, an apparatus, or as computer program instructions included on a computer readable medium such as a computer readable storage medium or a computer network wherein program instructions are sent over optical or electronic communication links. In general, the steps of disclosed processes may be performed in an arbitrary order, unless otherwise provided in the claims.

In some embodiments of the invention, execution of the sequences of instructions to practice the invention is performed by a single computer system 1100. According to some embodiments of the invention, two or more computer systems 1100 coupled by communication link 1120 (e.g., LAN, PSTN, or wireless network) may perform the sequence of instructions to practice the invention in coordination with one another. Computer system 1100 may transmit and receive messages, data, and instructions, including program, i.e., application code, through communication link 1120 and communication interface 1112. Received program code may be executed by processor 1104 as it is received, and/or stored in disk drive 1110, or other non-volatile storage for later execution.

Although the foregoing embodiments have been described in some detail for purposes of clarity of understanding, implementations of the above-described system and techniques is not limited to the details provided. There are many alternative implementations and the disclosed embodiments are illustrative and not restrictive.

What is claimed is:

1. A system for merging interchangeable advertisements with a requested audio and/or video object over a computer network, such as the Internet, the system comprising a first server including one or more hardware processors and a memory coupled to the one or more hardware processor wherein the memory includes instructions that, when executed by the one or more hardware processors, cause the one or more hardware processors to perform operations including to:

receive a first request over the computer network from a device, wherein:
the device is configured to play audio and/or video,
the first request comprises an audio and/or video identifier,
the audio and/or video identifier identifies an audio and/or video object,
a first media format corresponds to a media format of the audio and/or video object, and
a first sampling rate corresponds to a sampling rate of the audio and/or video object;
transmit a second request to an ad server, the second request comprising the audio and/or video identifier;
receive a response from the ad server, the response comprising:
a first advertisement identifier, wherein:
the first advertisement identifier identifies a first advertisement, the first advertisement being audio and/or video,
the first advertisement identifier is selected by the ad server based on the audio and/or video identifier,
a second media format corresponds to a media format of the first advertisement, and
a second sampling rate corresponds to a sampling rate of the first advertisement; and
a location identifier identifying a location where the first advertisement is to be merged with the audio and/or video object;
retrieve the first advertisement;
merge the first advertisement with the audio and/or video object at the location to create a first merged object when the first media format matches the second media format and the first sampling rate matches the second sampling rate;

merge a second advertisement with the audio and/or video object at the location to create a second merged object when the first media format does not match the second media format and/or the first sampling rate does not match the second sampling rate, wherein:
the first server converts the first advertisement into a second advertisement,
a third media format corresponds to a media format of the second advertisement,
a third sampling rate corresponds to a sampling rate of the second advertisement, and
the third media format matches the first media format and/or the third sampling rate matches the first sampling rate; and
transmit the first merged object or the second merged object to the device.

2. The system for merging interchangeable advertisements with the requested audio and/or video object over the computer network as recited in claim 1, further comprising the ad server, wherein the ad server is configured to:
receive the second request; and
compose the response.

3. The system for merging interchangeable advertisements with the requested audio and/or video object over the computer network as recited in claim 1, further comprising the ad server configured to track a number of the second request received from the first server.

4. The system for merging interchangeable advertisements with a requested audio and/or video object over a computer network as recited in claim 3, wherein the first server is further configured to:
monitor the transmission of the first merged object or the second merged object to the device; and
send a third request to the ad server to reduce the number of the second request received from the first server when the first merged object and/or the second merged object is not completed.

5. The system for merging interchangeable advertisements with the requested audio and/or video object over the computer network as recited in claim 1, further comprising the ad server, wherein the ad server is configured to:
receive a content request for the first advertisement; and
retrieve the first advertisement.

6. The system for merging interchangeable advertisements with the requested audio and/or video object over the computer network as recited in claim 1, wherein the first server is configured as a World Wide Web (Web) server.

7. A method for providing interchangeable advertisements with a requested audio and/or video object over a computer network, such as the Internet, the method comprising:
receiving a first request over the computer network from a device, wherein:
the device is configured to play audio and/or video,
the first request comprises an audio and/or video identifier,
the audio and/or video identifier identifies an audio and/or video object,
a first media format corresponds to a media format of the audio and/or video object, and
a first sampling rate corresponds to a sampling rate of the audio and/or video object;
transmitting a second request to an ad server, the second request comprising the audio and/or video identifier;
receiving a response from the ad server, the response comprising:
a first advertisement identifier, wherein:
the first advertisement identifier identifies a first advertisement, the first advertisement being audio and/or video,
the first advertisement identifier is selected by the ad server based on the audio and/or video identifier,
a second media format corresponds to a media format of the first advertisement, and
a second sampling rate corresponds to a sampling rate of the first advertisement; and
a location identifier identifying a location where the first advertisement is to be merged with the audio and/or video object;
retrieving the first advertisement;
merging the first advertisement with the audio and/or video object at the location to create a first merged object when the first media format matches the second media format and the first sampling rate matches the second sampling rate;
converting the first advertisement into a second advertisement when the first media format does not match the second media format and/or the first sampling rate does not match the second sampling rate, and merging the second advertisement with the audio and/or video object at the location to create a second merged object, wherein:
a third media format corresponds to a media format of the second advertisement,
a third sampling rate corresponds to a sampling rate of the second advertisement, and
the third media format matches the first media format and/or the third sampling rate matches the first sampling rate; and
transmitting the first merged object or the second merged object to the device.

8. The method for providing interchangeable advertisements with the requested audio and/or video object over the computer network as recited in claim 7, wherein retrieving the first advertisement comprises retrieving the first advertisement from a cache of the first server.

9. The method for providing interchangeable advertisements with the requested audio and/or video object over the computer network as recited in claim 7, further comprising:
receiving a third request for a second audio and/or video object from a second device configured to play audio and/or video;
determining not to merge the second audio and/or video object with an advertisement; and
transmitting the second audio and/or video object to the second device.

10. The method for providing interchangeable advertisements with the requested audio and/or video object over the computer network as recited in claim 9, wherein the second device is the first device.

11. The method for providing interchangeable advertisements with the requested audio and/or video object over the computer network as recited in claim 7, wherein the retrieving the first advertisement comprises:
sending a content request to the ad server for the first advertisement; and
receiving the first advertisement from the ad server.

12. The method for providing interchangeable advertisements with the requested audio and/or video object over the computer network as recited in claim 7, wherein merging the first advertisement with the audio and/or video object comprises preserving metadata associated the audio and/or video object and erasing metadata associated with the first advertisement.

13. The method for providing interchangeable advertisements with the requested audio and/or video object over the computer network as recited in claim 7, wherein the ad server is configured as a World Wide Web (Web) server.

14. A system for merging interchangeable advertisements with a requested audio and/or video object over a computer network, such as the Internet, the system comprising:

a first server including one or more hardware processors and a memory coupled to the one or more hardware processor wherein the memory includes instructions that, when executed by the one or more hardware processors, cause the one or more hardware processors to perform operations including to:

receive a first request over the computer network from a device, wherein:
the device is configured to play audio and/or video,
the first request comprises an audio and/or video identifier,
the audio and/or video identifier identifies an audio and/or video object, and
the audio and/or video object comprises one or more attributes;

transmit a second request to an ad server, the second request comprising the audio and/or video identifier;

receive a response from the ad server, the response comprising:
a mergeable advertisement, wherein:
the mergeable advertisement is audio and/or video,
the mergeable advertisement comprises one or more another attributes, the one or more another attributes of the mergeable advertisement match the one or more attributes of the audio and/or video object; and
a location identifier identifying a location where the mergeable advertisement is to be merged with the audio and/or video object;

merge the mergeable advertisement with the audio and/or video object at the location to create a merged object; and transmit the merged object to the device; and the ad server configured to:
receive the second request from the first server;
select a first advertisement based on the audio and/or video identifier, wherein the first advertisement comprises one or more further attributes;
compose the response to send to the first server comprising the first advertisement as the mergeable advertisement when the one or more further attributes of the first advertisement match the one or more attributes of the audio and/or video object; and
compose the response to send to the first server comprising a second advertisement as the mergeable advertisement when the one or more further attributes of the first advertisement do not match the one or more attributes of the audio and/or video object, wherein the ad server converts the first advertisement into the second advertisement so that the one or more additional attributes of the mergeable advertisement match the one or more attributes of the audio and/or video object.

15. The system for merging interchangeable advertisements with the requested audio and/or video object over the computer network as recited in claim 14, wherein the first server is further configured to authenticate the first request from the device.

16. The system for merging interchangeable advertisements with the requested audio and/or video object over the computer network as recited in claim 14, wherein the ad server is further configured to track a number of the second request received from the first server.

17. The system for merging interchangeable advertisements with the requested audio and/or video object over the computer network as recited in claim 16, wherein the number of the second request is tracked according to a type of media processing software used by the device.

18. The system for merging interchangeable advertisements with the requested audio and/or video object over the computer network as recited in claim 16, wherein the ad server is configured to reduce the number of the second request when the merged object is not fully transmitted to the device.

19. The system for merging interchangeable advertisements with the requested audio and/or video object over the computer network as recited in claim 14, wherein the first server is configured to preserve metadata associated with the audio and/or video object and erase metadata associated with the mergeable advertisement.

20. The system for merging interchangeable advertisements with the requested audio and/or video object over the computer network as recited in claim 14, wherein the first server is configured as a World Wide Web (Web) server.

* * * * *